(12) United States Patent
Uematsu

(10) Patent No.: US 11,440,582 B2
(45) Date of Patent: Sep. 13, 2022

(54) DETECTION UNIT

(71) Applicant: DENSO CORPORATION, Kariya (JP)

(72) Inventor: Nao Uematsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 186 days.

(21) Appl. No.: 16/823,745

(22) Filed: Mar. 19, 2020

(65) Prior Publication Data

US 2020/0307677 A1   Oct. 1, 2020

(30) Foreign Application Priority Data

Mar. 28, 2019 (JP) .............................. JP2019-062397

(51) Int. Cl.
| | | |
|---|---|---|
| *B62D 5/04* | (2006.01) | |
| *B62D 15/02* | (2006.01) | |
| *B60W 10/20* | (2006.01) | |
| *B60W 50/029* | (2012.01) | |

(52) U.S. Cl.
CPC .............. *B62D 5/049* (2013.01); *B60W 10/20* (2013.01); *B62D 5/0484* (2013.01); *B62D 15/021* (2013.01); *B60W 2050/0292* (2013.01)

(58) Field of Classification Search
CPC ...................................................... B62D 5/049
See application file for complete search history.

(56) References Cited

U.S. PATENT DOCUMENTS

| | | | | |
|---|---|---|---|---|
| 9,573,622 B2 * | 2/2017 | Fujita | .................. | B62D 15/021 |
| 10,328,972 B2 * | 6/2019 | Fujita | ..................... | G01D 5/145 |
| 10,620,068 B2 * | 4/2020 | Jo | ......................... | G01L 25/003 |
| 10,717,462 B2 * | 7/2020 | Oka | .................... | G01D 5/24461 |
| 10,859,406 B2 * | 12/2020 | Richard | ............. | G01R 33/0029 |
| 11,091,201 B2 * | 8/2021 | Fujita | ................. | B62D 15/0215 |
| 2015/0239501 A1 | 8/2015 | Fujita et al. | | |
| 2016/0231142 A1 | 8/2016 | Kawano et al. | | |
| 2017/0291640 A1 | 10/2017 | Fujita et al. | | |
| 2018/0216965 A1 | 8/2018 | Richard et al. | | |
| 2019/0039643 A1 | 2/2019 | Oka et al. | | |
| 2019/0041240 A1 | 2/2019 | Kuwahara | | |
| 2019/0152524 A1 | 5/2019 | Fujita et al. | | |
| 2020/0001919 A1 * | 1/2020 | Niewiadomski | ..... | B62D 15/025 |
| 2020/0307603 A1 * | 10/2020 | Kobayashi | ............ | B60W 40/06 |
| 2020/0307677 A1 * | 10/2020 | Uematsu | .............. | B62D 5/0484 |

(Continued)

FOREIGN PATENT DOCUMENTS

| | | |
|---|---|---|
| JP | H05-53658 A | 3/1993 |
| JP | H08-202459 A | 8/1996 |

(Continued)

*Primary Examiner* — Michael A Berns

(74) *Attorney, Agent, or Firm* — Maschoff Brennan

(57) ABSTRACT

A detection unit has a rotation angle sensor including at least three detection elements detecting a change of physical quantity and outputting angle signals respectively corresponding to detection values of the respective detection elements. The detection unit also has a controller including an abnormality monitor monitoring the angle signals and identifying the respective angle signals either as a normal signal or an abnormal signal. The controller either outputs a value corresponding to at least one of two normal signals when two or more normal signals are identified or stops output regarding the detection signal when two or more normal signals are not identified.

14 Claims, 17 Drawing Sheets

(56) References Cited

U.S. PATENT DOCUMENTS

2020/0307682 A1* 10/2020 Fujita .................... B62D 5/046
2020/0309566 A1* 10/2020 Fujita ................ G01D 5/24476

FOREIGN PATENT DOCUMENTS

| JP | 5339094 B2 | 11/2013 |
| JP | 5958572 B2 | 8/2016 |
| JP | 5095845 B2 | 3/2017 |
| JP | 2017191092 A | 10/2017 |
| JP | 2017191093 A | 10/2017 |
| JP | 2018-077096 A | 5/2018 |

* cited by examiner (BOTH SYSTEM NORMAL)

(SYSTEM P1 ABNORMAL)

FIG. 12

| RETRY # | SYSTEM P1 | | | SYSTEM P2 | | |
|---|---|---|---|---|---|---|
| | PAIRED | | ABN HIST REC FOR COMP RESULT NORMAL TIME | PAIRED | | ABN HIST REC FOR COMP RESULT NORMAL TIME |
| | FOR OUTPUT | FOR ABN MON | | FOR OUTPUT | FOR ABN MON | |
| 0 | DA1 | DB1 | — | DA2 | DB2 | — |
| 1 | DA1 | DA2 | ABN OF DB1 | DA2 | DA1 | ABN OF DB2 |
| 2 | DA1 | DB2 | ABN OF DB1, DA2 | DA2 | DB1 | ABN OF DB2, DA1 |
| 3 | DB1 | DA2 | ABN OF DA1 | DB2 | DA1 | ABN OF DA2 |
| 4 | DB1 | DB2 | ABN OF DA1, DA2 | DB2 | DB1 | ABN OF DA2, DA1 |
| 5 | DA2 | DB2 | ABN OF DA1, DB1 | DA1 | DB1 | ABN OF DA2, DB2 |

DETECTION UNIT

CROSS REFERENCE TO RELATED APPLICATION

The present application is based on and claims the benefit of priority of Japanese Patent Application No. 2019-062397, filed on Mar. 28, 2019, the disclosure of which is incorporated herein by reference.

TECHNICAL FIELD

The present disclosure generally relates to a detection unit.

BACKGROUND INFORMATION

The related art includes a motor rotation angle detection device that detects a rotation angle of a motor.

In the related art, when a failure of such device is detected by comparing outputs of a main rotation angle sensor and a sub rotation angle sensor and having a value of equal to or greater than a preset threshold as a difference of the outputs of both sensors, the output of the main rotation angle sensor and the output of the sub rotation angle sensor are further compared with an output of a redundant rotation angle sensor respectively, and a sensor whose output has a smaller difference from the output of the redundant rotation angle sensor is identified as a normal rotation angle sensor, and the output of the normal rotation angle sensor is used as a rotation angle of the motor for a continuation of assist operation.

In the related art, when the main rotation angle sensor and the sub rotation angle sensor fail at the same time, the sensor output value having a smaller difference from the output of the redundant rotation angle sensor is used as a "normal" motor angle. However, in such a situation, when the main rotation angle sensor and the sub rotation angle sensor simultaneously become abnormal due to a common cause failure, there may be a possibility that an abnormal sensor output value may be determined as normal.

SUMMARY

It is an object of the present disclosure to provide a detection unit capable of continuing to provide a normal output even when abnormality occurs in some of the detection elements used therein.

BRIEF DESCRIPTION OF THE DRAWINGS

Objects, features, and advantages of the present disclosure will become more apparent from the following detailed description made with reference to the accompanying drawings, in which:

FIG. 12 is an illustration diagram of a retry table according to a fifth embodiment;

DETAILED DESCRIPTION

Hereinafter, a detection unit according to the present disclosure will be described based on the drawings. In the following plural embodiments, substantially same structural configurations are designated with the same reference numbers thereby to simplify the description.

First Embodiment

Figure 1:
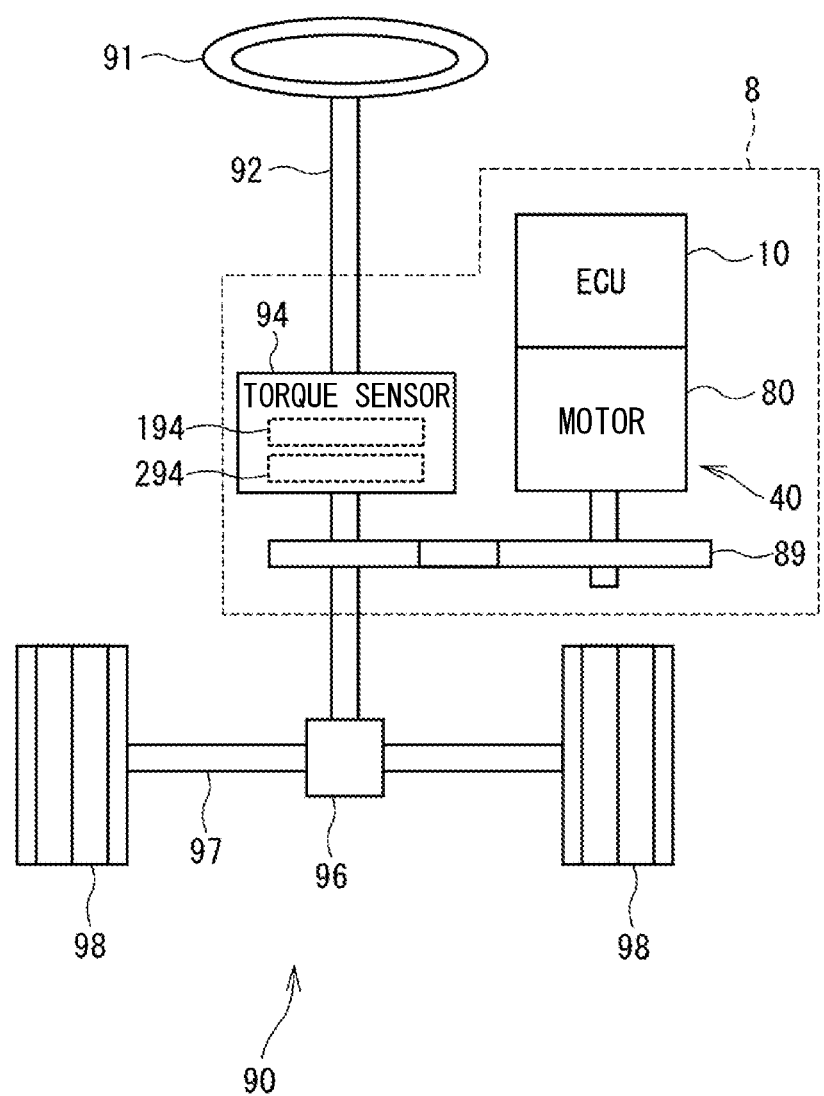
FIG. 1 is a schematic diagram of a steering system according to a first embodiment.

The detection unit according to the first embodiment is shown in FIGS. 1 to 6. As shown in FIG. 1, an ECU 10 as a detection unit is applied to an electric power steering apparatus 8 for assisting a steering operation of a vehicle together with a motor 80 which is a rotating electric machine. FIG. 1 shows an overall configuration of a steering system 90 including the electric power steering apparatus 8. The steering system 90 includes a steering wheel 91, a steering shaft 92, a pinion gear 96, a rack shaft 97, road wheels 98, the electric power steering apparatus 8 and the like.

The steering wheel 91 is connected to the steering shaft 92. A torque sensor 94 is provided on the steering shaft 92 to detect a steering torque. The torque sensor 94 includes a first torque detection unit 194 and a second torque detection unit 294. The pinion gear 96 is provided at an axial end of the steering shaft 92. The pinion gear 96 meshes with the rack shaft 97. A pair of road wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 is steered to an angle corresponding to the displacement amount of the rack shaft 97.

The electric power steering apparatus 8 includes a drive device 40, which includes the motor 80 and the ECU 10, and a speed-reduction gear 89 or the like as a power transmission mechanism that reduces the rotation speed of the motor 80 and transmits the rotation to the steering shaft 92. The electric power steering apparatus 8 of the present embodiment is a column assist type, but it may alternatively be a rack assist type that transmits the rotation of the motor 80 to the rack shaft 97. In the present embodiment, the steering shaft 92 corresponds to a driven object.

Figure 2:
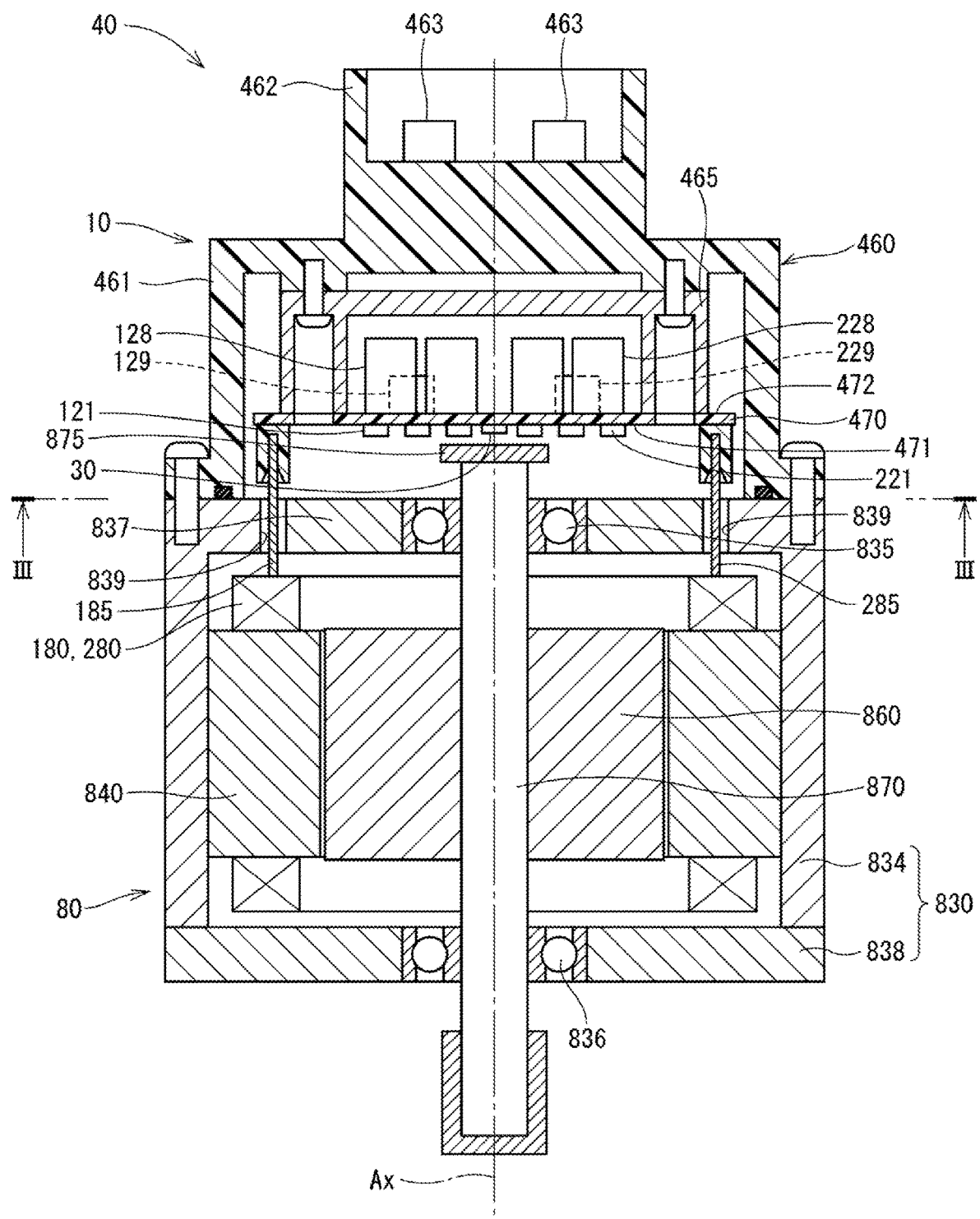
FIG. 2 is a cross-sectional view of a drive device according to the first embodiment.
Figure 3:
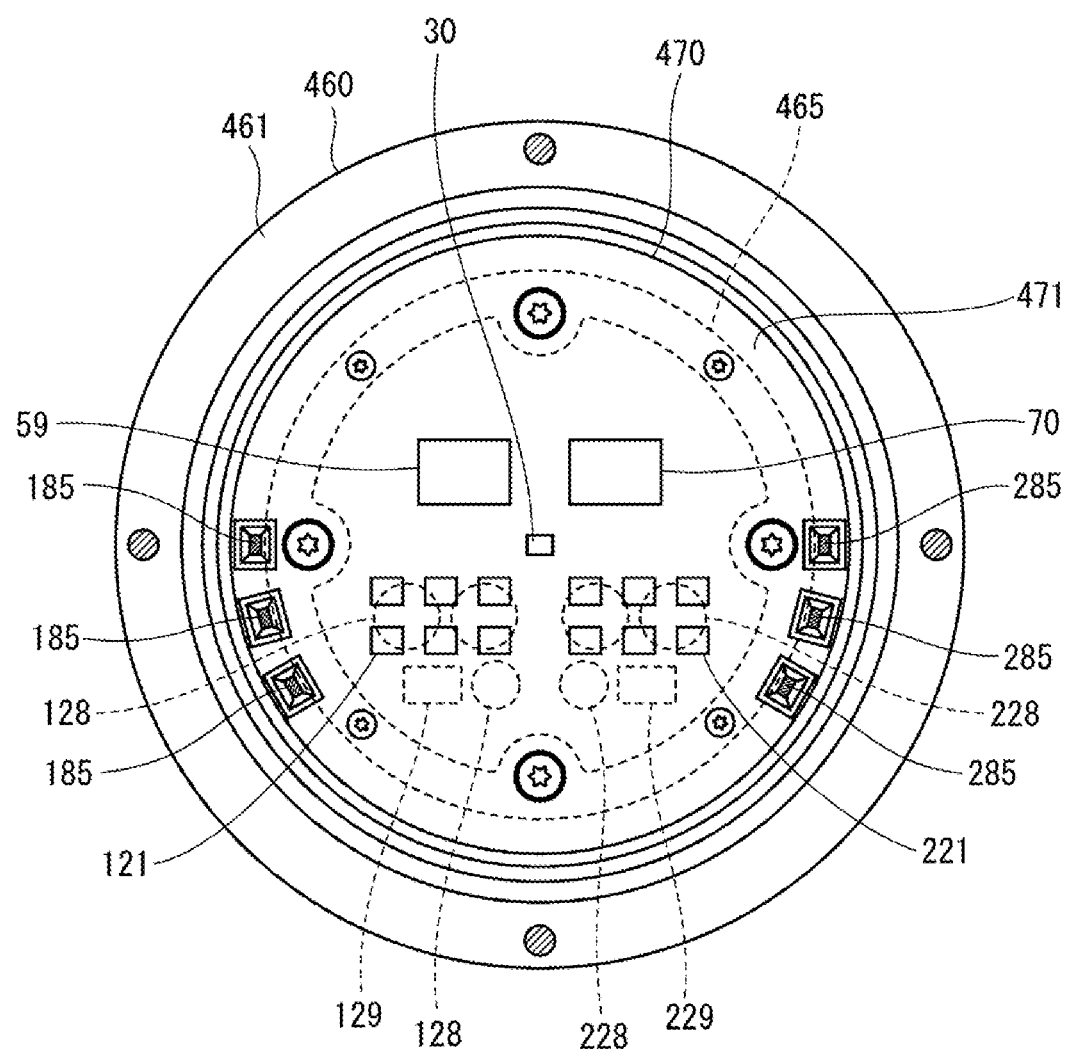
FIG. 3 is a cross-sectional view taken along a line III-III in FIG. 2.

As shown in FIGS. 2 and 3, the motor 80 outputs part or all of the torque required for steering, and is driven by the supply of electric power from a battery (not shown) to drive the speed-reduction gear 89 in a forward and backward rotation. The motor 80 is a three-phase brushless motor and has a rotor 860 and a stator 840 as shown in FIG. 2.

The motor 80 has a first motor winding 180 and a second motor winding 280 as a winding set. The motor windings 180 and 280 have the same electrical characteristics, and are cancel-wound around the common stator 840 at a shift of an electrical angle of 30 [deg] from each other. Correspondingly, phase currents are controllably supplied to the motor windings 180 and 280 such that the phase currents have a phase difference φ of 30 degrees. By optimizing a current supply phase difference, the output torque is improved. It may also reduce a sixth-order torque ripple. Further, since the electric current is averaged among the motor windings by the supply of electric current with phase difference, benefits of cancellation of noise and vibration are maximized. Further, since heat generation is also averaged among the motor windings (i.e., among two systems of motor winding and other components), temperature-dependent inter-system error regarding the detection value of each sensor and the torque is reducible while suppliable electric current is averaged among the two systems. Note that the electrical characteristics of the motor windings 180 and 280 may be different from each other.

Hereinafter, the configuration of a first drive circuit 120 and the like related to a drive control of the first motor winding 180 will be referred to as the first system L1, and the configuration of a second drive circuit 220 and the like related to a drive control of the second motor winding 280 will be referred to as a second system L2. Further, the configuration related to the first system L1 is basically indicated with reference numbers of 100, and the configuration related to the second system L2 is basically indicated with reference numbers of 200. In the first system L1 and the second system L2, same or similar configuration is indicated with same reference numbers in the least significant two digits. Further, when appropriate, the term "first" is indicated with a suffix "1," and the term "second" is indicated with a suffix "2."

In the drive device 40, the ECU 10 is integrally provided on one axial end of the motor 80, which may bear a name of mechanism-circuit integrated type drive device. However, the motor 80 and the ECU 10 may also be disposed separately from each other. The ECU 10 is disposed coaxially with an axis Ax of a shaft 870 on one side opposite to an output shaft of the motor 80. The ECU 10 may alternatively be disposed on an output shaft side of the motor 80. By adopting the mechanism-circuit integrated type configuration, an efficient arrangement of the ECU 10 and the motor 80 in a restricted installation space of the vehicle is realized.

The motor 80 includes the stator 840, the rotor 860, a housing 830 which houses the stator 840 and the rotor 860 therein and the like. The stator 840 is fixed to the housing 830 and the motor windings 180 and 280 are wound thereon. The rotor 860 is provided at a radial inside of the stator 840 to be rotatable relative to the stator 840.

The shaft 870 is fitted in the rotor 860 to rotate integrally with the rotor 860. The shaft 870 is rotatably supported by the housing 830 by bearings 835 and 836. An end portion of the shaft 870 on the ECU 10 side protrudes from the housing 830 toward the ECU 10. A magnet 875 is provided at an axial end of the shaft 870 on the ECU 10 side. The center of the magnet 875 is disposed on the axis Ax.

The housing 830 includes a bottomed cylindrical case 834, which has a rear frame end 837, and a front frame end 838 provided on an open side of the case 834. The case 834 and the front frame end 838 are fastened to each other by bolts or the like. Lead wire insertion holes 839 are formed in the rear frame end 837. Lead wires 185 and 285 connected to each phase of the motor windings 180 and 280 are inserted through the lead wire insertion holes 839. The lead wires 185 and 285 are taken out from the lead wire insertion holes 839 toward the ECU 10, and are connected to a circuit board 470.

The ECU 10 includes a cover 460, a heat sink 465 fixed to the cover 460, the circuit board 470 fixed to the heat sink 465, other electronic components mounted on the circuit board 470 and the like.

The cover 460 is provided to protect the electronic components from external impacts and to prevent dust and water from entering into an inside of the ECU 10. In the cover 460, a cover main body 461 and a connector member 462 are integrally formed. Note that the connector member 462 may alternatively be separated from the cover main body 461. Terminals 463 of the connector member 462 are connected to the circuit board 470 via a wiring (not shown) or the like. The number of connectors and the number of terminals may be changed in correspondence to the number of signals and the like. The connector member 462 is provided at an end portion in the axial direction of the drive device 40, and is open on one side opposite to the motor 80.

The circuit board 470 is, for example, a printed circuit board, and is positioned to face the rear frame end 837. On the circuit board 470, electronic components for two systems are mounted in two separate regions for each system. Nota that, although shared electronic components between the two systems such as the controller 70 and the like are mounted on a single circuit board 470 in the present embodiment, such electronic components may also be mounted on (i.e., distributed among) a plurality of circuit boards.

Of two principal surfaces of the circuit board 470, one surface facing the motor 80 is referred to as a motor-side surface 471, and the other surface opposite to the motor 80 is referred to as a cover-side surface 472. As shown in FIG. 3, on the motor-side surface 471, switching elements 121 constituting the drive circuit 120, switching elements 221 constituting the drive circuit 220, a rotation angle sensor 30 serving as a detection device, a custom IC 59, the controller 70 implemented as a microcomputer and the like are mounted. In FIG. 3, a number 70 is assigned to a microcomputer which comprises the controller 70. Also, when appropriate, the controller 70 may be referred to as a "microcomputer." At least one of the custom IC 59 and the controller 70 may be provided on the cover-side surface 472. The rotation angle sensor 30 is mounted at a position facing the magnet 875 so as to be able to detect a change in the magnetic field caused by the rotation of the magnet 875.

Capacitors 128 and 228, and inductors 129 and 229 are mounted on the cover-side surface 472 together with other components. The capacitors 128 and 228 smooth the electric power input from the battery. Further, the capacitors 128 and 228 assist supply of electric power to the motor 80 by storing electric charge therein. The capacitors 128, 228 and the inductors 129, 229 are provided to form a filter circuit, to reduce transmission of noises from other devices sharing the same battery, and also to reduce transmission of noises from the drive device 40 to the other, battery-sharing device. Note that, power supply relays, motor relays, current sensors, etc.

(not shown in the drawings) are also mounted on the motor-side surface 471 or on the cover-side surface 472.

Figure 4:
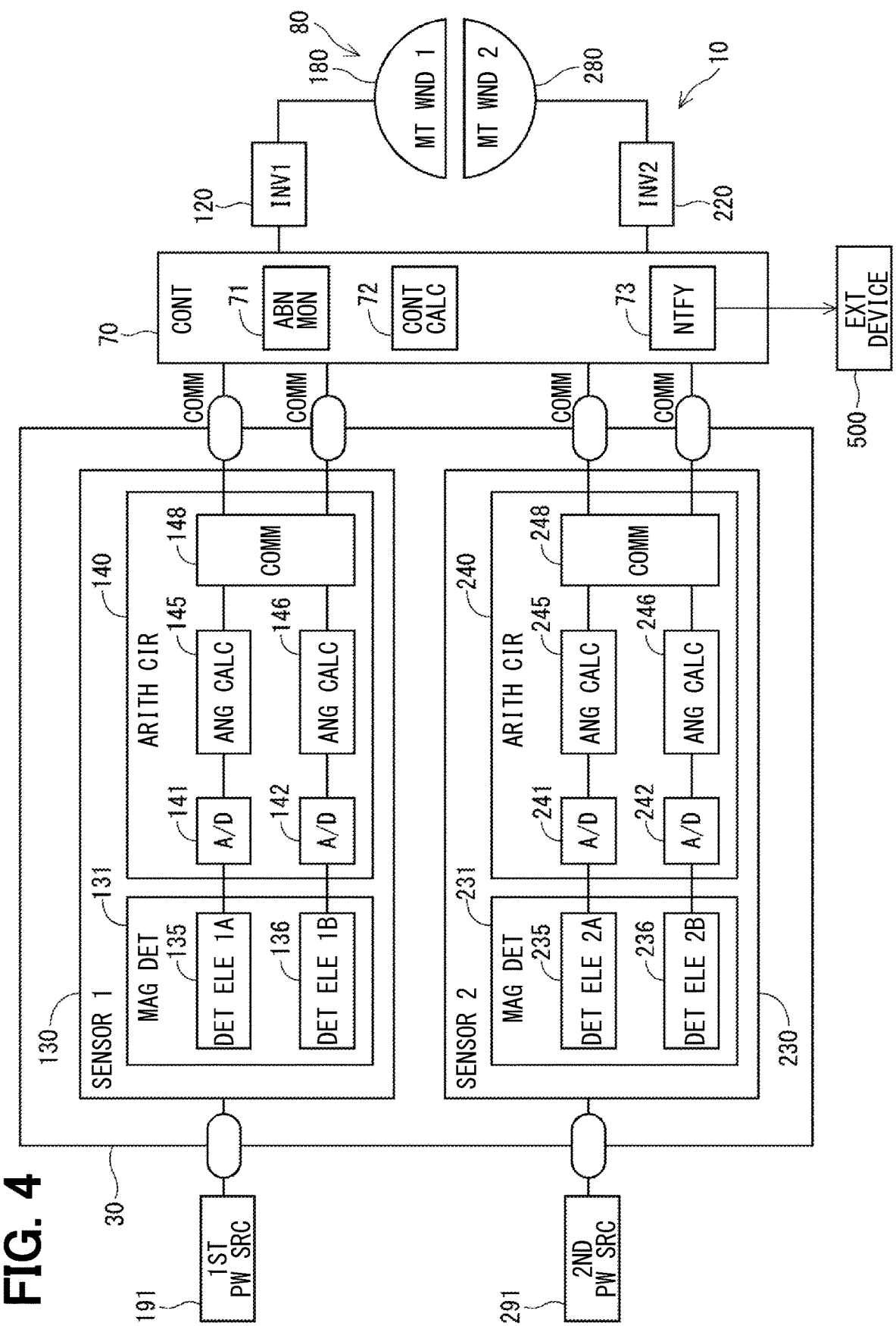
FIG. 4 is a block diagram of an electronic control unit (ECU) according to the first embodiment.

As shown in FIG. 4, the ECU 10 includes drive circuits 120 and 220, the controller 70, the rotation angle sensor 30, and the like. In FIG. 4, the drive circuit, which is generally an inverter, is designated as "INV." The first drive circuit 120 is a three-phase inverter having six switching elements 121, which converts the electric power supplied to the first motor winding 180. The second drive circuit 220 is a three-phase inverter having six switching elements 221, which converts the electric power supplied to the second motor winding 280. The on/off operation of the switching elements 121 and 221 is controlled based on a control signal output from the controller 70.

The rotation angle sensor 30 includes a first sensor unit 130 and a second sensor unit 230. The sensor units 130 and 230 output detection values to the controller 70. The sensor units 130 and 230 may be separately packaged or may be integrally packaged in one body. Hereinafter, the first sensor unit 130 is referred to as a system P1, and the second sensor unit 230 is referred to as a system P2. The sensor units 130 and 230 have the same configuration, and therefore, the first sensor unit 130 will be mainly described in the following, and the description of the second sensor unit 230 will be omitted as appropriate. The same applies to a seventh embodiment and an eighth embodiment.

The first sensor unit 130 includes a first magnetic field detector 131 and a first arithmetic circuit 140, and electric power is supplied from the first power source 191. The first power source 191 is an ignition power source or a regulator power source. The first power source 191 and a second power source 291 described later may be connected to a same battery, or may be connected to a different battery, respectively.

The first magnetic field detector 131 includes detection elements 135 and 136. The detection elements 135 and 136 detect a change in the magnetic field of the magnet 875 according to the rotation of the motor 80, and may be implemented as a magneto-resistive element such as an AMR sensor, a TMR sensor, or a GMR sensor, or a Hall element, for example. The detection elements 135 and 136 desirably have different sensor characteristics. For example, the detection element 135 is an AMR element, and the detection element 136 is a TMR element. Here, it may also be considered as having a different element configuration related to the sensor element when, for example, difference is seen in sensor layout, in sensor material combination ratio, in production lot, in wafer number of the lot, or in a chip position in the same wafer, even when the element type is the same. Further, it may also be considered as having a different element configuration when difference is seen not only in the element but also in a surrounding circuit and the like, such as the detection circuit and the arithmetic circuit connected to the sensor element, and in the type and voltage of the power source supplied to the sensor element. By using the elements having different sensor characteristics, a common cause failure such as a magnetic flux density abnormality is avoidable, which is preferable from the viewpoint of functional safety. The same applies to detection elements 137 and 237 in the embodiments described later. Hereinafter, whenever appropriate, a value related to the detection element 135 and to the detection values of the detection element 135 are designated as "1A," and a value related to the detection element 136 and to the detection values of the detection element 136 are designated as "1B."

The first arithmetic circuit 140 includes AD converters 141 and 142, angle calculators 145 and 146, and a communication unit 148. The AD converter 141 performs AD conversion on the detection value of the detection element 135, and outputs the result to the angle calculator 145. The AD converter 142 performs AD conversion on the detection value of the detection element 136 and outputs the result to the angle calculator 146.

The angle calculator 145 calculates an angle signal DA1 according to the detection value of the detection element 135. The angle calculator 146 calculates an angle signal DB1 according to the detection value of the detection element 136. The angle signals DA1 and DB1 are values corresponding to the rotation angle of the rotor 860, which may be any value that can be converted to the rotation angle.

The communication unit 148 transmits the angle signals DA1 and DB1 to the controller 70. In the present embodiment, the angle signals DA1 and DB1 are output to the controller 70 by digital communication such as SPI communication. The communication method may, for example, not only be SPI communication, but may also be other communication methods. Although communication lines are provided for each of the angle signals DA1 and DB1 in FIG. 4, a composite signal including the angle signals DA1 and DB1 may be generated, and the angle signals DA1 and DB1 may be transmitted to the controller 70 through one communication line.

The second sensor unit 230 includes a second magnetic field detector 231 and a second arithmetic circuit 240, and electric power is supplied from the second power source 291. The second magnetic field detector 231 includes detection elements 235 and 236. In the present embodiment, the types of the detection elements 235 and 236 are different, and hereinafter, the values related to the detection element 235 and to the detection values of the detection element 235 are designated as "2A," and the values related to the detection element 236 and to the detection values of the detection element 236 are designated as "2B."

The second arithmetic circuit 240 includes AD converters 241 and 242, angle calculators 245 and 246, and a communication unit 248. The AD converters 241 and 242 perform AD conversion on the detection values of the detection elements 235 and 236, respectively, and output the result to the angle calculators 245 and 246. The angle calculator 245 calculates an angle signal DA2 according to the detection value of the detection element 235, and the angle calculator 246 calculates an angle signal DB2 according to the detection value of the detection element 236. The communication unit 248 outputs the angle signals DA2 and DB2 to the controller 70.

The controller 70 is mainly composed of a microcomputer and the like, and includes a CPU, a ROM, a RAM, an I/O, and a bus line connecting these components, which are not shown. The processing performed by the controller 70 may be software processing by executing a program stored in advance in a tangible memory device (that is, a computer-readable, non-transitory, tangible recording medium) such as a ROM by a CPU, or it may be hardware processing by a dedicated electronic circuit. The same applies to controllers 170 and 270 according to the embodiments described later.

The controller 70 includes an abnormality monitor 71, a control calculator 72, and a notification unit 73. The abnormality monitor 71 obtains the angle signals DA1, DB1, DA2, DB2 from the sensor units 130, 230, performs abnormality monitoring of the angle signals DA1, DB1, DA2, DB2, and identifies a normal signal that is normal and an abnormal signal having abnormality.

When it is determined that two or more angle signals are normal, the control calculator 72 performs a drive control of the motor 80 based on at least one of the angle signals determined as normal and a detection value of a current sensor (not shown), and the like. Further, when the number of the angle signals determined as normal is one or less, the abnormality monitoring is not continuable thereby drive of the motor 80 is stopped.

The notification unit 73 notifies an external device 500 of the abnormality of the rotation angle sensor 30. The external device 500 is, for example, a high-class ECU or the like that manages an entire control scheme of the vehicle. The notification unit 73 notifies the external device 500 either of first abnormality information indicating that at least one of the angle signals is abnormal or second abnormality information indicating that the number of the normal angle signals one or less. When the first abnormality information is notified, the external device 500, for example, lights a warning lamp or the like to let a user know that an abnormality has occurred in the electric power steering apparatus 8, for prompting him/her to bring the vehicle to a dealer or a repair shop. Notification to the user may also be performed by a method other than lighting the warning lamp, such as voice or sound. Further, when the second abnormality information is notified, the vehicle may be promptly stopped, for example, since the steering assist is not performable. In such manner, a failsafe process may be differently performed depending on the abnormality information.

Hereinafter, abnormality monitoring of the angle signal is described. When the same type of element (for example, a TMR element) is used for all of the detection elements 135, 136, 235, and 236, a common cause failure may occur due to a magnetic flux density abnormality. In the present embodiment, since different types of elements are used as the detection element 135 and the detection element 136 in the system P1, a common cause failure due to a magnetic flux density abnormality is less likely to occur. Similarly, in the system P2, since different types of elements are used as the detection element 235 and the detection element 236, a common cause failure due to a magnetic flux density abnormality is less likely to occur.

Further, since the detection elements 135 and 136 are connected to the same first power source 191, there is a possibility that a common cause failure may occur due to a power source abnormality. Similarly, since the detection elements 235 and 236 are connected to the same second power source 291, there is a possibility that a common cause failure may occur due to a power source abnormality. On the other hand, the detection elements 135 and 136 and the detection elements 235 and 236 are less likely to suffer from a common cause failure due to the power source abnormality. Therefore, even if two detection elements out of the detection elements 135, 136, 235, 236 become abnormal due to a common cause failure, mutual monitoring of the detection values of the remaining two detection elements enables continuation of normal sensor output.

Figure 5:
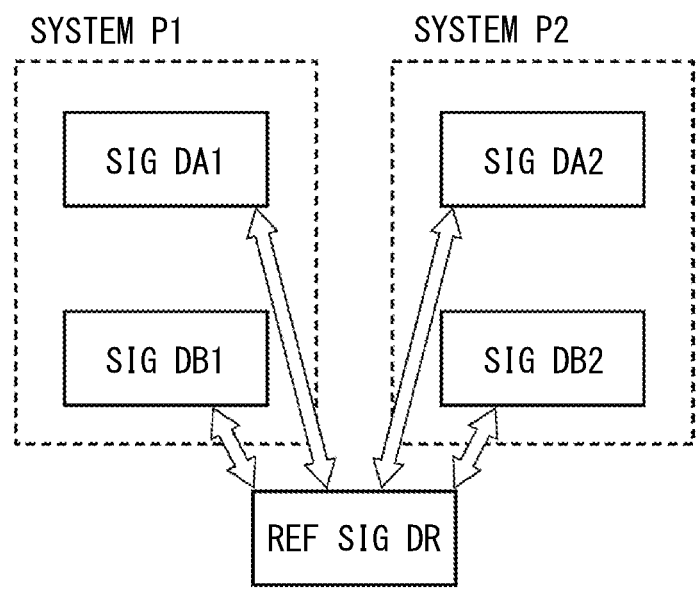
FIG. 5 is an illustration of an abnormality monitoring process according to the first embodiment.
Figure 6:
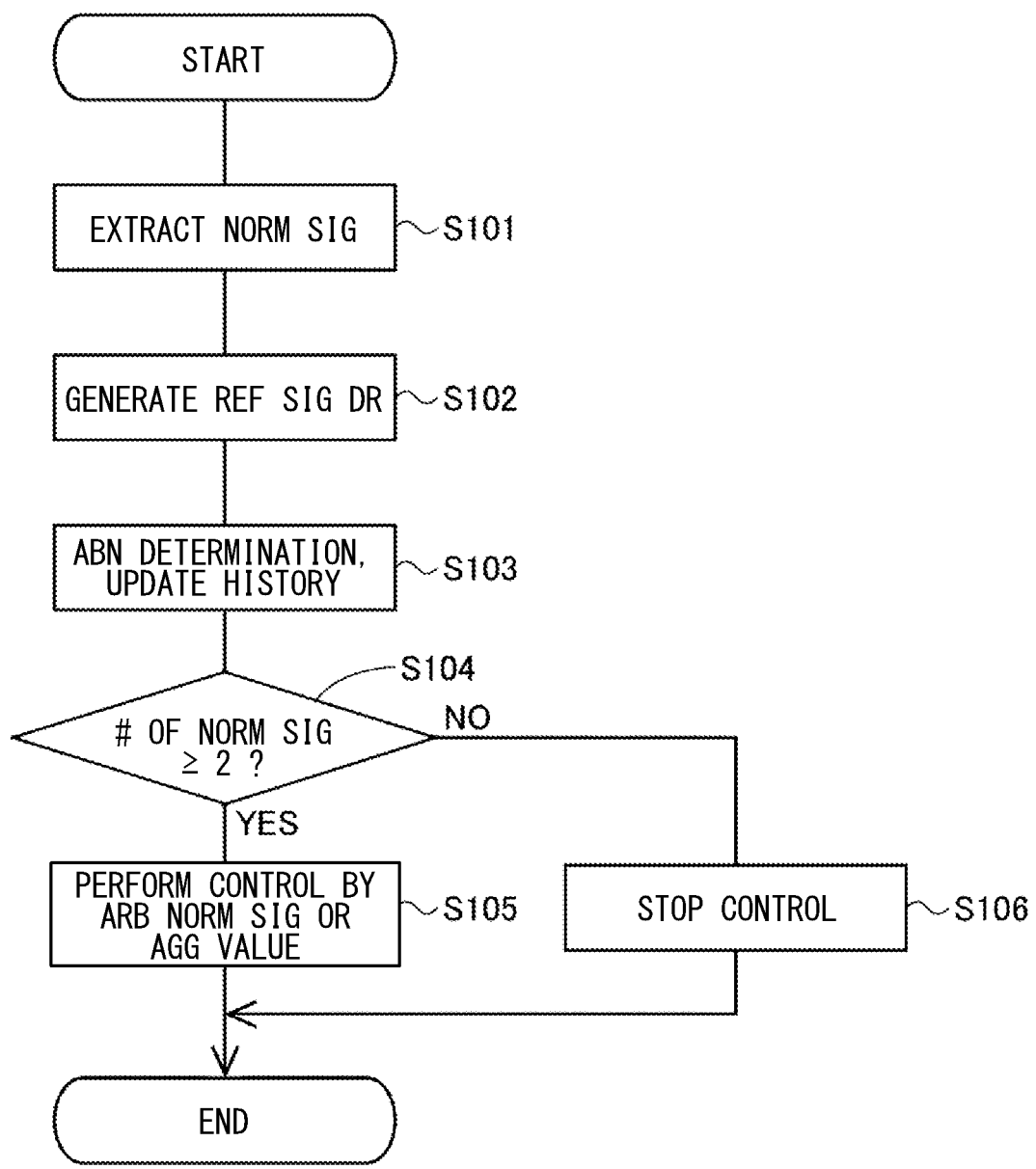
FIG. 6 is a flowchart illustrating the abnormality monitoring process according to the first embodiment.

Abnormality monitoring according to the present embodiment is shown in FIGS. 5 and 6. As shown in FIG. 5, a reference signal DR is generated by aggregating signals from normal detection elements among the angle signals DA1, DB1, DA2, DB2, and the generated reference signal DR is compared with the angle signals DA1, DB1, DA2, DB2 respectively, for the determination of abnormality of the angle signals DA2, DA2, DB2. In other words, if two of the angle signals DA1, DB1, DA2, and DB2 are normal, the reference signal DR is generated, which enables mutual monitoring of the angle signals. The reference signal DR in the present embodiment is a median of the normal signals. The reference signal DR may also be an average value or a predicted value using an estimation method such as a Kalman filter, a particle filter or the like.

The abnormality monitoring process of the present embodiment is described based on the flowchart of FIG. 6. The abnormality monitoring process is performed by the controller 70 in a predetermined cycle. Hereinafter, the "step" of step S101 is abbreviated as a symbol "S." The same applies to the other steps.

In S101, the abnormality monitor 71 examines an abnormality history, and extracts normal signals from among the angle signals DA1, DB1, DA2, and DB2. It is assumed that there is no initial abnormality, and in the first calculation, all angle signals DA1, DB1, DA2, DB2 are normal. In S102, the controller 70 generates a reference signal DR using the normal signals.

In S103, the abnormality monitor 71 performs abnormality determination of the angle signals DA1, DB1, DA2, and DB2 using the reference signal DR. In the present embodiment, when a difference between the angle signal DA1 and the reference signal DR is smaller than an abnormality determination threshold TH1, the angle signal DA1 is determined as normal, and when the difference therebetween is greater than the abnormality determination threshold TH1, the angle signal DA1 is determined as abnormal. The same determination is made for the angle signals DB1, DA2, DB2. Further, the controller 70 updates abnormality history information according to the determination result.

In S104, the abnormality monitor 71 determines whether there are two or more normal signals. Here, although the determination value according to control continuation is set to 2, depending on the number of sensors or system configuration, the determination value of 2 may be arbitrarily changed to the other value greater than 2. When it is determined that there are two or more normal signals (S104: YES), the process proceeds to S105. In S105, the control calculator 72 performs calculation related to a drive control of the motor 80 using an arbitrary normal signal or an aggregate value of a plurality of normal signals. The aggregate value used for the drive control may be the same as the reference signal DR, or may be a value obtained by calculation different from that of the reference signal DR. When it is determined that the number of normal signals is one or less (S104: NO), it is determined that the rotation angle sensor 30 is abnormal, and the process proceeds to S106. In S106, the controller 70 stops the output of the angle signal, and stops the drive control of the motor 80.

As described above, the ECU 10 of the present embodiment includes the rotation angle sensor 30 and the controller 70. The rotation angle sensor 30 has at least three detection elements 135, 136, 235, 236 for detecting a change in the magnetic field, which is a physical quantity that changes according to the rotation of the magnet 875, and outputs the angle signals DA1, DB1, DA2, DB2 according to the detection values of the detection elements 135, 136, 235, 236.

The controller 70 has the abnormality monitor 71. The abnormality monitor 71 monitors the angle signals DA1, DB1, DA2, and DB2, and identifies a normal signal that is a normal angle signal and an abnormal signal that is an angle signal having abnormality. The controller 70 outputs a value corresponding to at least one normal signal when two or more normal signals are identified, and stops the output related to the angle signal when two or more normal signals are not identified. Here, "an output related to an angle signal" includes not only an output from the controller 70 to the outside (e.g., to an external device), but also an internal output of the controller 70, such as an output to the control calculator 72, for example.

In such manner, the angle signals DA1, DB1, DA2, and DB2 are appropriately monitored, and normal output is continuable even when some of the detection signals have abnormality. Further, since no abnormal signal is output, control based on a normal angle signal is performable, which prevents erroneous control using the abnormal angle signal.

The detection elements include the main detection elements 135, 235 and the sub detection elements 136, 236. A combination of the main detection elements 135 and 235 and the sub detection elements 136 and 236 is defined as a system. More practically, a combination of the main detection element 135 and the sub detection element 136 is referred to as the system P1, and a combination of the main detection element 235 and the sub detection element 236 is referred to as the system P2. The rotation angle sensor 30 is provided with a plurality of systems.

Further, the main detection elements 135 and 235 and the sub detection elements 136 and 236 are different in configuration related to the sensor elements. Here, "configuration related to the element" means that the type of the element is different (for example, a TMR element, an AMR element, a Hall element, etc.) and the internal configuration of the element is different (for example, a wafer is different, an in-wafer) position is different, a layout is different, a material is different, a manufacturing condition is different, a production lot is different, etc.), the circuit configuration connected to the element is different, or the type and/or voltage of the electric power supplied to the element is different. In such manner, the probability of a common cause failure among the main detection elements 135 and 235 and the sub detection elements 136 and 236 is reducible. Further, the rotation angle sensor 30 is connected to the separate power sources 191 and 291 system to system. In such manner, the probability of a common cause failure is reducible among the systems P1 and P2.

The abnormality monitor 71 calculates the reference signal DR using at least two angle signals, and compares each of the angle signals DA1, DB1, DA2, and DB2 with the reference signal DR to identify a normal signal. In such manner, the normal signal is appropriately identifiable.

The controller 70 includes the notification unit 73 that notifies the external device 500 of abnormality information related to abnormality of the angle signals DA1, DB1, DA2, and DB2. The notification unit 73 notifies the external device 500 of the first abnormality information indicating abnormality of at least one angle signal and the second abnormality information indicating that the number of normal angle signals is one or less according to the situation of abnormality. In such manner, appropriate process is performable according to an abnormal state of the rotation angle sensor 30.

The detection object of the present embodiment rotates integrally with the rotor 860 of the motor 80, and the detection signal is an angle signal according to the rotation angle of the rotor 860. Thus, the rotation angle of the rotor 860 is appropriately detectable, and the normal signal is used to appropriately drive and control the motor 80. The electric power steering apparatus 8 includes the ECU 10 and the motor 80. Thus, the steering operation of the user is appropriately assisted and controlled by using the normal signal only.

Second Embodiment

Figure 7:
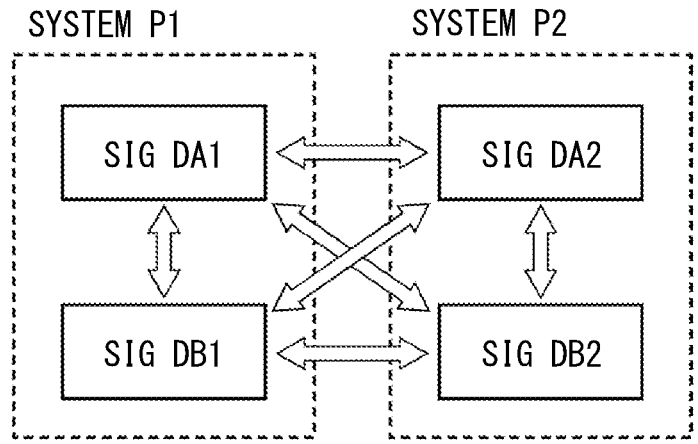
FIG. 7 is an illustration of the abnormality monitoring process according to a second embodiment.
Figure 8:
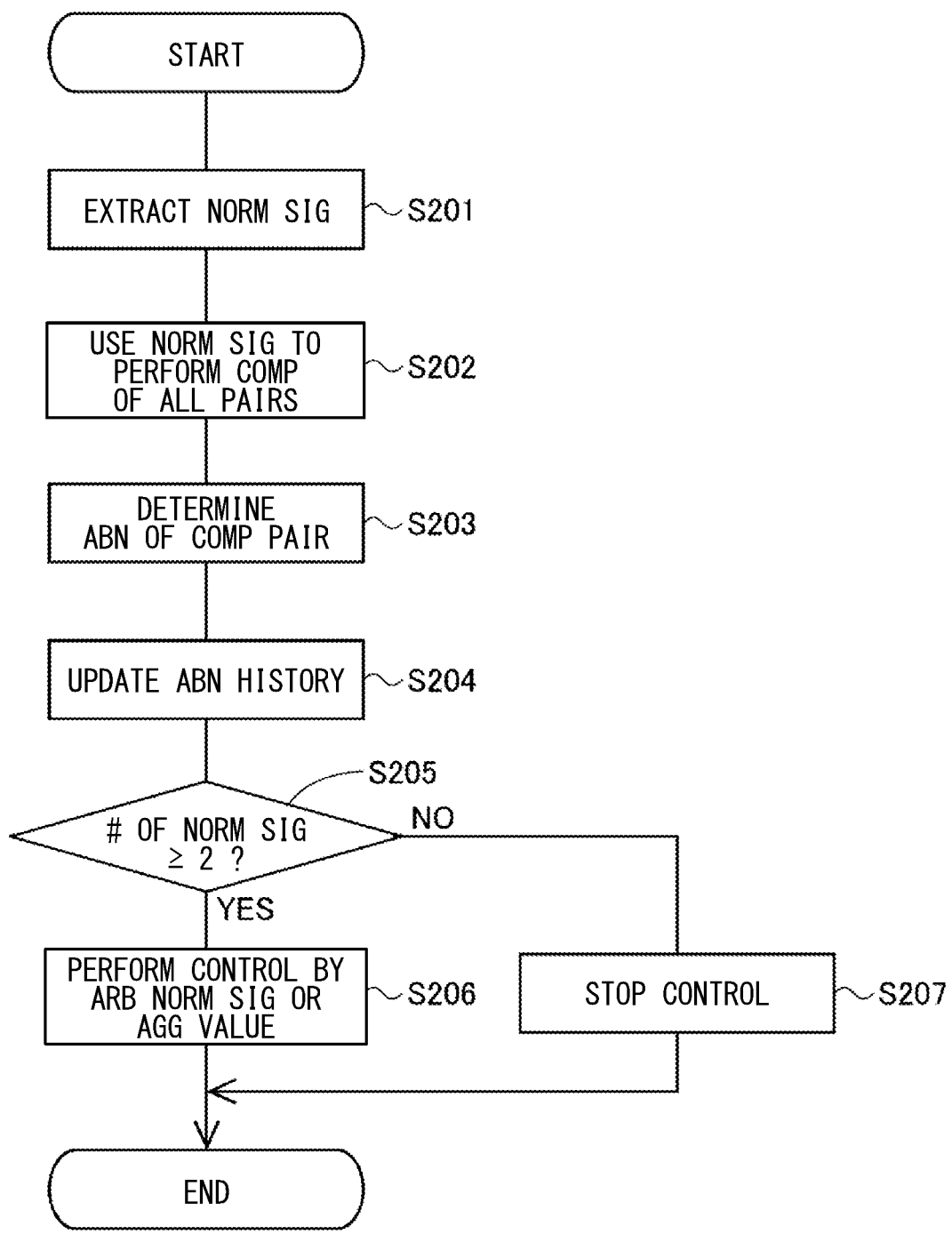
FIG. 8 is a flowchart illustrating the abnormality monitoring process according to the second embodiment.

The second embodiment is shown in FIGS. 7 and 8. In the second to sixth embodiments, the abnormality monitoring processing of the angle signals DA1, DB1, DA2, DB2 is respectively different. Therefore, the description in those embodiments focuses on such difference, with other points omitted as appropriate.

As shown in FIG. 7, signal comparison is performed in all combinations in which two of the angle signals DA1, DB1, DA2, and DB2 are selected, and signals of a normal pair are regarded and treated as normal sensor outputs in the present embodiment. If there are two or more normal signals, normal sensor output is continuable. Here, if an output difference ΔD between the two angle signals is equal to or less than an abnormality determination threshold, a "comparison result is normal," and if the output difference D is greater than the abnormality determination threshold, a "comparison result is abnormal." The same is applicable to the other embodiments described later. The abnormality determination threshold may appropriately be set.

The abnormality monitoring process of the present embodiment is described based on the flowchart of FIG. 8. The process of S201 is the same as S101 in FIG. 6. In S202, the controller 70 uses a normal signal to perform signal comparison in all pairs.

At S203, the controller 70 performs abnormality determination of the comparison pair. When the output difference ΔD between the two compared signals is equal to or less than an abnormality determination threshold TH2, the comparison result is determined as normal, and the pair is determined as a normal pair. When the output difference ΔD between the two compared signals is greater than the abnormality determination threshold TH2, the comparison result is determined as abnormal, and the pair is determined as an abnormal pair.

In S204, the controller 70 identifies an abnormal signal, and updates the abnormality history information. In the present embodiment, assuming that the number of normal sensors used in S202 is n, the angle signal determined as the abnormal pair by (n−1) times is identified as an abnormal signal. The processes of S205 to S207 are the same as the processes of S104 to S106 in FIG. 6.

In the present embodiment, the abnormality monitor 71 compares the two angle signals DA1, DB1, DA2, and DB2, and identifies a normal signal according to whether the comparison result is normal. The abnormality monitor 71 compares the angle signals DA1, DB1, DA2, and DB2 in all combinations to identify an abnormal signal. Thus, if there are two or more normal signals, the output related to the angle signal is continuable. Further, the present embodiment also provides the same advantages as those of the above embodiment.

Third Embodiment, Fourth Embodiment

Figure 9A:
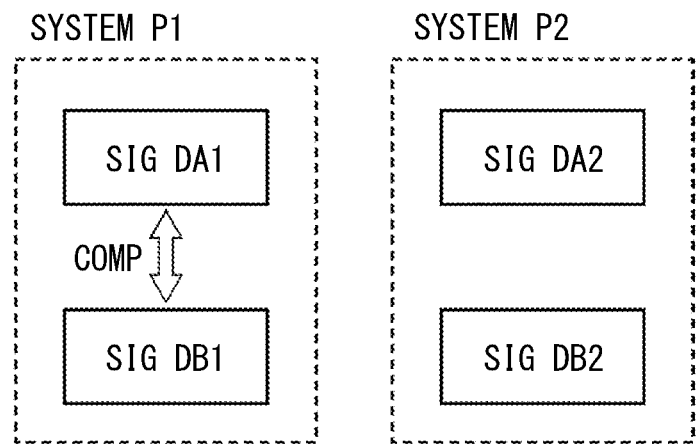
FIGS. 9A and 9B are respectively an illustration of the abnormality monitoring process according to a third embodiment.
Figure 9B:
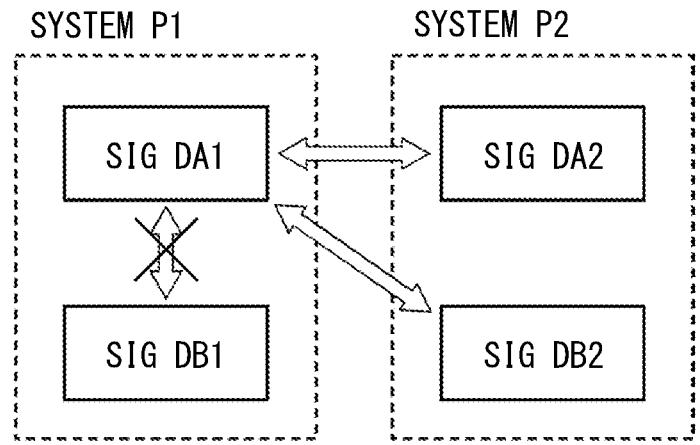
Figure 10:
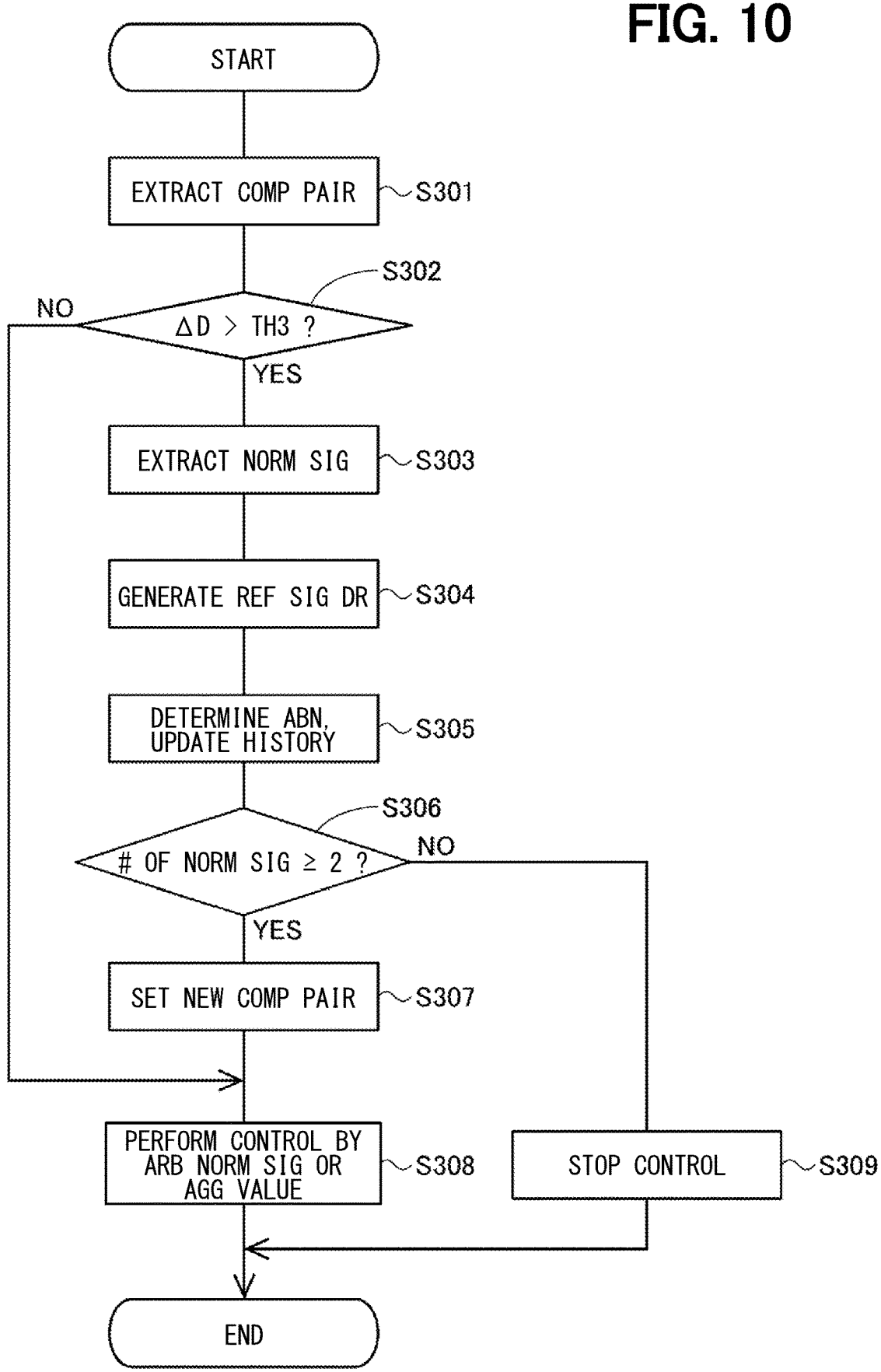
FIG. 10 is a flowchart illustrating the abnormality monitoring process according to the third embodiment.

The third embodiment is shown in FIGS. 9A, 9B and 10, and the fourth embodiment is shown in FIG. As shown in FIG. 9A, an arbitrary signal comparison pair is set in advance as a default pair, and signal comparison is performed in such comparison pair in the present embodiment. When the comparison result in the default pair is abnormal, as shown in FIG. 9B, a new pair is searched for, and a pair whose output difference ΔD is equal to or less than an abnormality determination threshold TH3 is set as a new signal comparison pair. By searching for a combination of normal sensors only when an abnormality occurs, the calculation load is reducible as compared to the case where an abnormal sensor is searched for each time the signal comparison is performed. When searching for a new signal comparison pair, in the third embodiment, a normal signal is identified by the method of the first embodiment, and in the fourth embodiment, a normal signal is identified by the method of the second embodiment.

The abnormality monitoring process of the third embodiment is described based on the flowchart of FIG. 10. In S301, the controller 70 extracts the angle signals for a comparison pair for which signal comparison is performed. Here, it is assumed that the angle signals DA1 and DB1 are set by default as a comparison pair. Also, two or more sets may be set as default, such as a first pair of the angle signals DA1 and DB1 and a second pair of the angle signals DA2 and DB2.

In S302, the controller 70 determines whether the output difference ΔD, which is the difference between the angle signals of the comparison pair, is greater than the abnormality determination threshold TH3. When it is determined that the output difference ΔD is equal to or less than the abnormality determination threshold TH3 (S302: NO), it is determined that the angle signals of the comparison pair are normal, and the process proceeds to S308. When it is determined that the output difference ΔD is greater than the abnormality determination threshold TH3 (S302: YES), the process proceeds to S303.

The processes of S303 to S307 are processes of searching for a new pair for identifying a normal signal, and are similar to the processes of S101 to S104 in FIG. 6. When it is determined in S306 that there are two or more normal signals (S306: YES), the process proceeds to S307 to set two, arbitrarily-chosen normal signals as a new signal comparison pair. When it is determined that the number of normal signals is one or less (306: NO), the process proceeds to S309. The processes of S308 and S309 are the same as the processes of S105 and S106 in FIG. 6.

Figure 11:
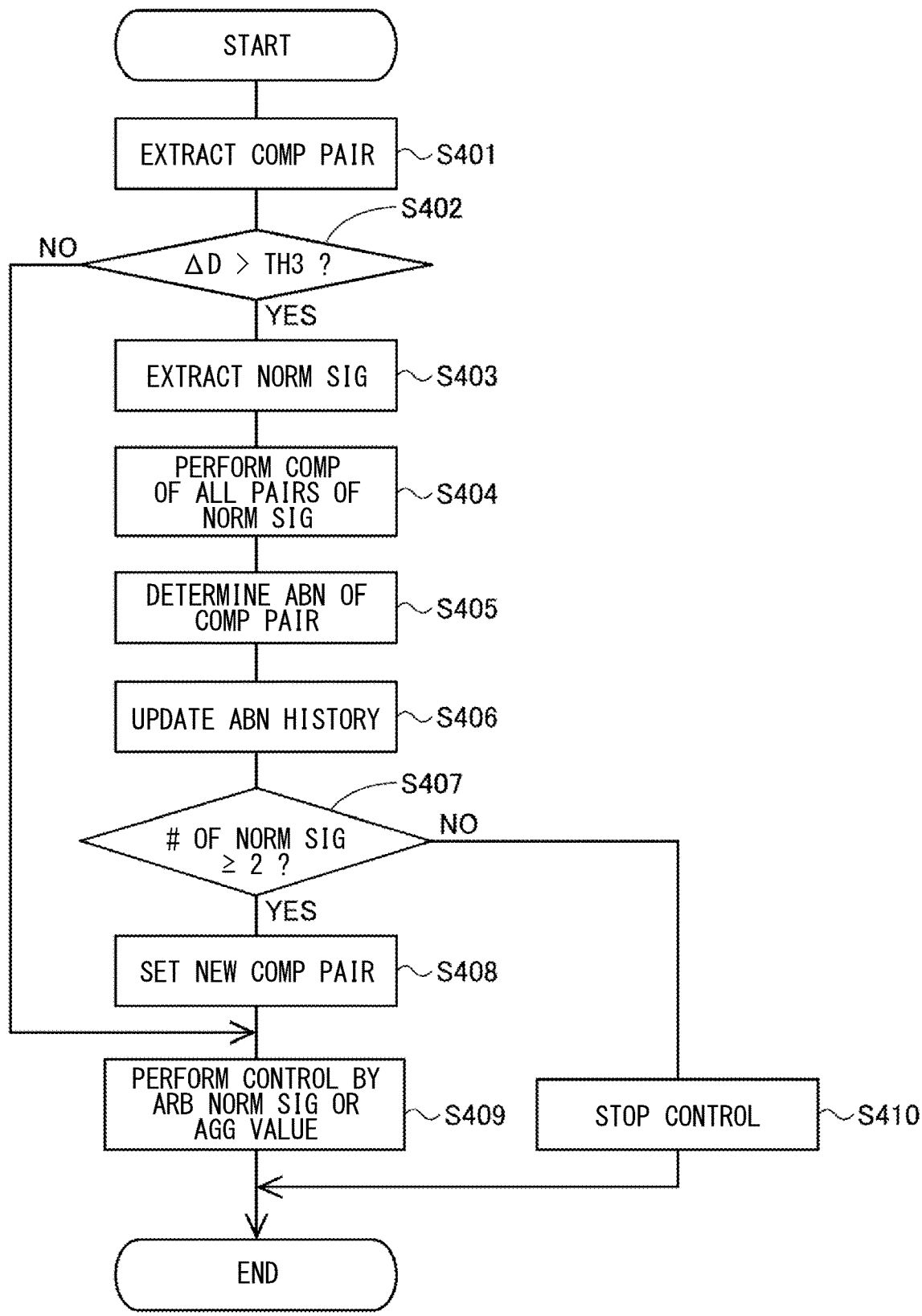
FIG. 11 is a flowchart illustrating the abnormality monitoring process according to a fourth embodiment.

The abnormality monitoring process of the fourth embodiment is described based on the flowchart of FIG. 11. The processes of S401 and S402 are the same as the processes of S301 and S302 in FIG. 10. When determination is affirmative in S402, the process proceeds to S403, and when determination is negative, the process proceeds to S409.

The processes of S403 to S407 are processes of searching for a new pair for identifying a normal signal, and are similar to the processes of S201 to S205 in FIG. 8. When it is determined in S407 that there are two or more normal signals (S407: YES), the process proceeds to S408, and just the same as in S307 of FIG. 10, any two of the normal signals are set as the new signal comparison pair. When it is determined that the number of normal signals is one or less (S407: NO), the process proceeds to S410. The processes of S409 and S410 are the same as the processes of S105 and S106 in FIG. 6.

In the present embodiment, the abnormality monitor 71 compares the two out of four angle signals DA1, DB1, DA2 and DB2, and identifies a normal signal according to whether the comparison result is normal, and at least one set of a subject-to-comparison pair is preset. When the comparison result of the subject-to-comparison pair is normal, the angle signals of the subject-to-comparison pair are respectively identified as a normal signal. Further, when the comparison result of the subject-to-comparison pair is abnormal, a new pair whose comparison result is normal is searched for. When a new pair whose comparison result is normal is found, both of the angle signals of such pair whose comparison result is normal are identified as a normal signal, and such pair is newly set as a subject-to-comparison pair for the next and subsequent calculations (i.e., arithmetic processing). In such manner, the normal signal is appropriately identifiable. Further, compared with the case of searching for an abnormal sensor every time, the calculation load is reducible. Further, the present embodiment also provides the same advantage as the above-described embodiments.

Fifth Embodiment

Figure 13:
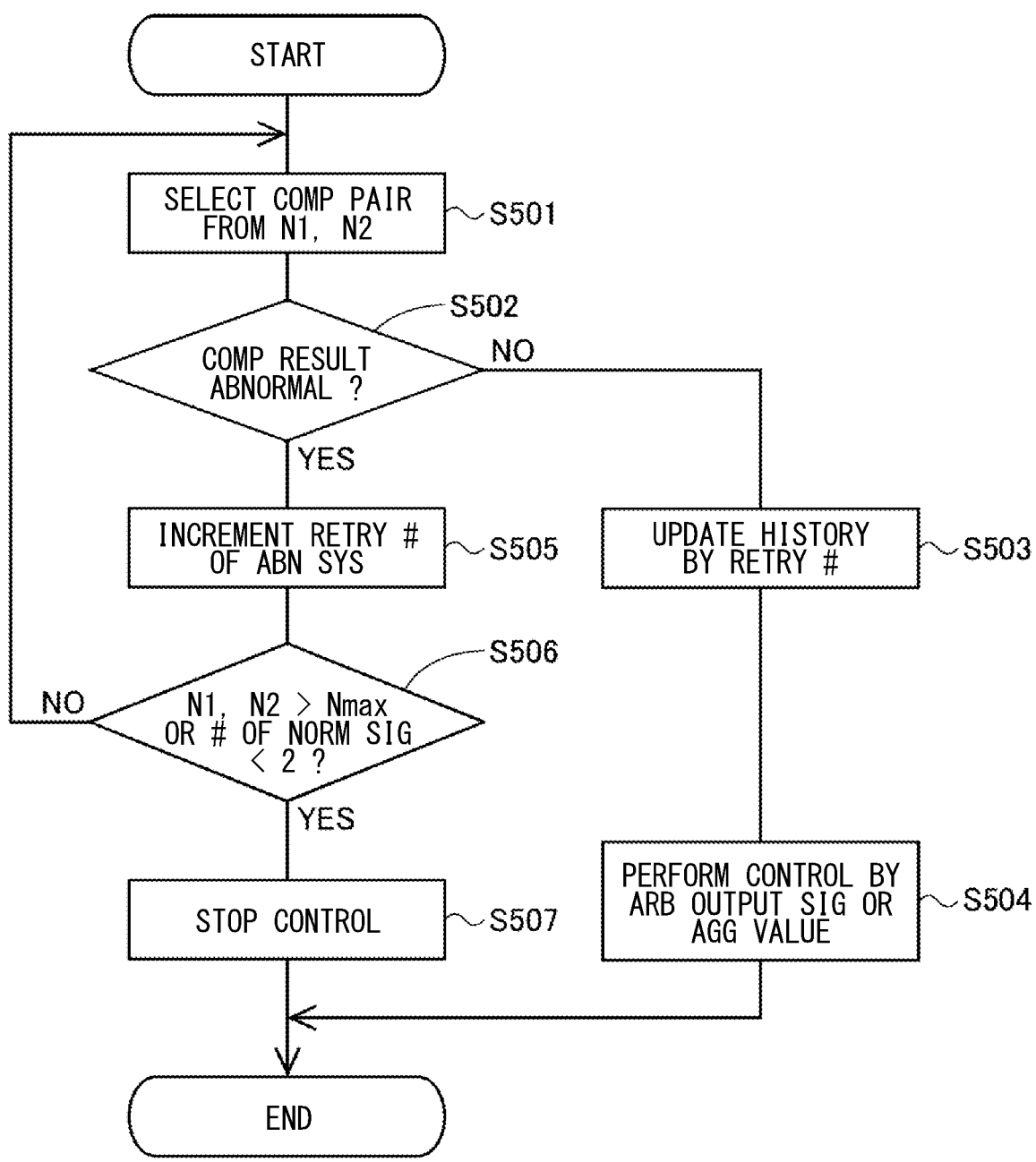
FIG. 13 is a flowchart illustrating the abnormality monitoring process according to the fifth embodiment.

The fifth embodiment is shown in FIGS. 12 and 13. In the abnormality monitoring process of the present embodiment, a signal comparison is performed for a pre-stored pair that is stored in a non-volatile memory or the like (not illustrated), without performing an all pairs comparison nor performing aggregation of output values from all sensors. Each pair is prepared by two sets for output and for abnormality monitoring, and if the comparison result is normal, a pair of signals set for output is used for control. If the comparison result is abnormal, the comparison pair is changed with a new pair, which has been set in advance, according to the number of retries.

A retry table is described based on FIG. 12. The retry table is stored in a storage such as a non-volatile memory (not shown). In the present embodiment, two systems P1 and P2 are set, and signals for output from respective systems are used for control calculation of the control calculator 72. In the present embodiment, the systems P1 and P2 correspond to the systems L1 and L2 described in the above, thereby output values of the system P1 are used for energization control of the first motor winding 180 and output values of the system P2 are used for energization control of the second motor winding 280. Further, output values from one of the systems P1 and P2 or aggregate value of output values from both of the systems P1 and P2 may be used for energization control of the motor windings 180 and 280.

First, the system P1 is described. In the system P1, the detection value of the first sensor unit 130 is prioritized. The priorities of the values to be used for output of the system P1 are, from high to low, DA1, DB1, and DA2. When the number of retries N1 is 0, a comparison pair is made up from the angle signal DA1 for output and the angle signal DB1 for abnormality monitoring. If the comparison result is normal, the angle signal DA1 is output, and if abnormal, the number of retries N1 is set to 1.

When the number of retries N1 is 1, a comparison pair is made up from the angle signal DA1 for output and the angle signal DA2 for abnormality monitoring. If the comparison result is normal, the angle signal DA1 is output, and the abnormality history information is updated with a record of the abnormality determination of the angle signal DB1 by determining abnormality of the angle signal DB1. If the comparison result is abnormal, the number of retries N1 is set to 2.

When the number of retries N1 is 2, a comparison pair is made up from the angle signal DA1 for output and the angle signal DB2 for abnormality monitoring. If the comparison result is normal, the angle signal DA1 is output, and the abnormality history information is updated with a record of the abnormality determination of the angle signals DB1 and DA2 by determining abnormality of the angle signals DB1 and DA2. If the comparison result is abnormal, the number of retries N1 is set to 3.

When the number of retries N1 is 3, a comparison pair is made up from the angle signal DB1 for output and the angle signal DA2 for abnormality monitoring. If the comparison result is normal, the angle signal DB1 is output, and the abnormality history information is updated with a record of the abnormality determination of the angle signal DA1 by determining abnormality of the angle signal DA1. If the comparison result is abnormal, the number of retries N1 is set to 4.

When the number of retries N1 is 4, a comparison pair is made up from the angle signal DB1 for output and the angle signal DB2 for abnormality monitoring. If the comparison result is normal, the angle signal DB1 is output, and the abnormality history information is updated with a record of the abnormality determination of the angle signals DA1 and DA2 by determining abnormality of the angle signals DA1 and DA2. If the comparison result is abnormal, the number of retries N1 is set to 5.

When the number of retries N1 is 5, a comparison pair is made up from the angle signal DA2 for output and the angle signal DB2 for abnormality monitoring. If the comparison result is normal, the angle signal DA2 is output, and the abnormality history information is updated with a record of the abnormality determination of the angle signals DA1 and DB1 by determining abnormality of the angle signals DA1 and DB1.

Next, the system P2 is described. In the system P2, the detection value of the second sensor unit 230 is prioritized. The priorities of the values to be used for output of the system P2 are, from high to low, DA2, DB2, and DA1. When the number of retries N2 is 0, a comparison pair is made up from the angle signal DA2 for output and the angle signal DB2 for abnormality monitoring. If the comparison result is normal, the angle signal DA2 is output, and if abnormal, the number of retries N2 is set to 1.

When the number of retries N2 is 1, a comparison pair is made up from the angle signal DA2 for output and the angle signal DA1 for abnormality monitoring. If the comparison result is normal, the angle signal DA2 is output, and the abnormality history information is updated with a record of the abnormality determination of the angle signal DB2 by determining abnormality of the angle signal DB2. If the comparison result is abnormal, the number of retries N2 is set to 2.

When the number of retries N2 is 2, a comparison pair is made up from the angle signal DA2 for output and the angle signal DB1 for abnormality monitoring. If the comparison result is normal, the angle signal DA2 is output, and the abnormality history information is updated with a record of the abnormality determination of the angle signals DB2 and DA1 by determining abnormality of the angle signals DB2 and DA1. If the comparison result is abnormal, the number of retries N2 is set to 3.

When the number of retries N2 is 3, a comparison pair is made up from the angle signal DB2 for output and the angle signal DA1 for abnormality monitoring. If the comparison result is normal, the angle signal DB2 is output, and the abnormality history information is updated with a record of the abnormality determination of the angle signal DA2 by determining abnormality of the angle signal DA2. If the comparison result is abnormal, the number of retries N2 is set to 4.

When the number of retries N2 is 4, a comparison pair is made up from the angle signal DB2 for output and the angle signal DB1 for abnormality monitoring. If the comparison result is normal, the angle signal DB2 is output, and the abnormality history information is updated with a record of the abnormality determination of the angle signals DA2 and DA1 by determining abnormality of the angle signals DA2 and DA1. If the comparison result is abnormal, the number of retries N2 is set to 5.

When the number of retries N2 is 5, a comparison pair is made up from the angle signal DA1 for output and the angle signal DB1 for abnormality monitoring. If the comparison result is normal, the angle signal DA1 is output, and the abnormality history information is updated with a record of the abnormality determination of the angle signals DA2 and DB2 by determining abnormality of the angle signals DA2 and Da1.

The abnormality monitoring process of the present embodiment is described based on the flowchart of FIG. 13. In S501, the abnormality monitor 71 selects a comparison pair of each system from the number of retries N1 of the first system and the number of retries N2 of the second system. In other words, in the present embodiment, it can be understood that a default pair is set for each system.

In S502, the abnormality monitor 71 determines whether the comparison result of the comparison pair selected in S501 is abnormal. When it is determined that the comparison result of at least one comparison pair is abnormal (S502: YES), the process proceeds to S505. When it is determined that the comparison results of all comparison pairs are normal (S502: NO), the process proceeds to S503.

In S503, the abnormality monitor 71 refers to the retry table, and updates the abnormality history information according to the number of retries. In S504, the control calculator 72 performs a calculation related to drive control of the motor 80 by using (i) an arbitrarily-chosen angle signal for output or an aggregate value of the angle signals for output.

In S505, to which the process proceeds when the comparison result of the selected comparison pair is abnormal (S502: YES), the abnormality monitor 71 increments the number of retries N1 and/or N2 of the abnormal system(s). For example, if the comparison result of the system P1 is abnormal and the comparison result of the system P2 is normal, the number of retries N1 related to the system P1 is incremented, and the number of retries N2 related to the system P2 is not incremented.

In S506, the abnormality monitor 71 determines whether the numbers of retries N1 and N2 of all systems are greater than a retry maximum value Nmax (i.e., 5 in the present embodiment) or whether the number of normal signals is less than 2. When it is determined that at least one of the numbers of retries N1 and N2 among the two systems is less than the maximum value Nmax and the number of normal signals is 2 or more (S506: NO), the process returns to S501 and performs a retry. Note that, in the process of S506, the number of normal signals is counted based on an assumption that a signal not yet determined as abnormal is considered as normal. In S507, to which the process proceeds when it is determined that the numbers of retries N1 and N2 of all systems are greater than the retry maximum value Nmax or the number of normal signals is less than 2 (S506: YES), it is determined that the rotation angle sensor 30 is abnormal, and the drive control of the motor 80 is stopped, just like S106 of FIG. 6.

In the present embodiment, the abnormality monitor 71 compares the two angle signals DA1, DB1, DA2, and DB2, and identifies a normal signal according to whether the comparison result is normal or not, and a subject-to-comparison pair is set in advance according to the number of retries. Further, the abnormality monitor 71 identifies an abnormal signal according to the number of retries. In such manner, the normal signal is appropriately identifiable. Further, the calculation load related to the identification of the abnormal sensor is reducible. Further, the present embodiment also provides the same advantage as the above-described embodiments.

Sixth Embodiment

Figure 14:
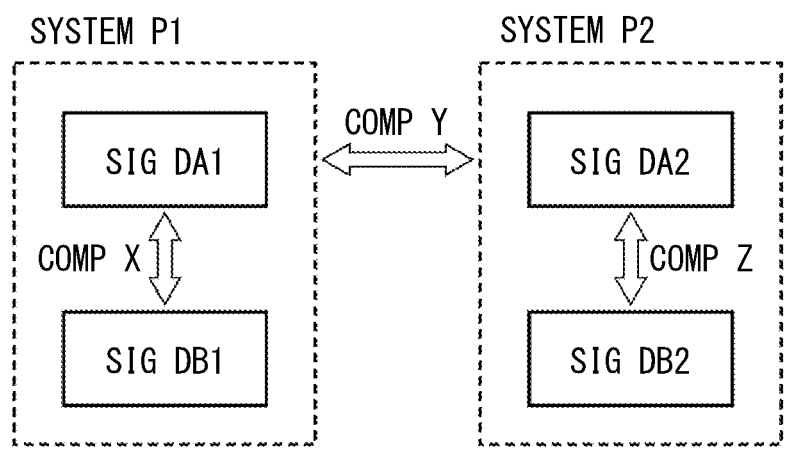
FIG. 14 is an illustration of the abnormality monitoring process according to a sixth embodiment.
Figure 15:
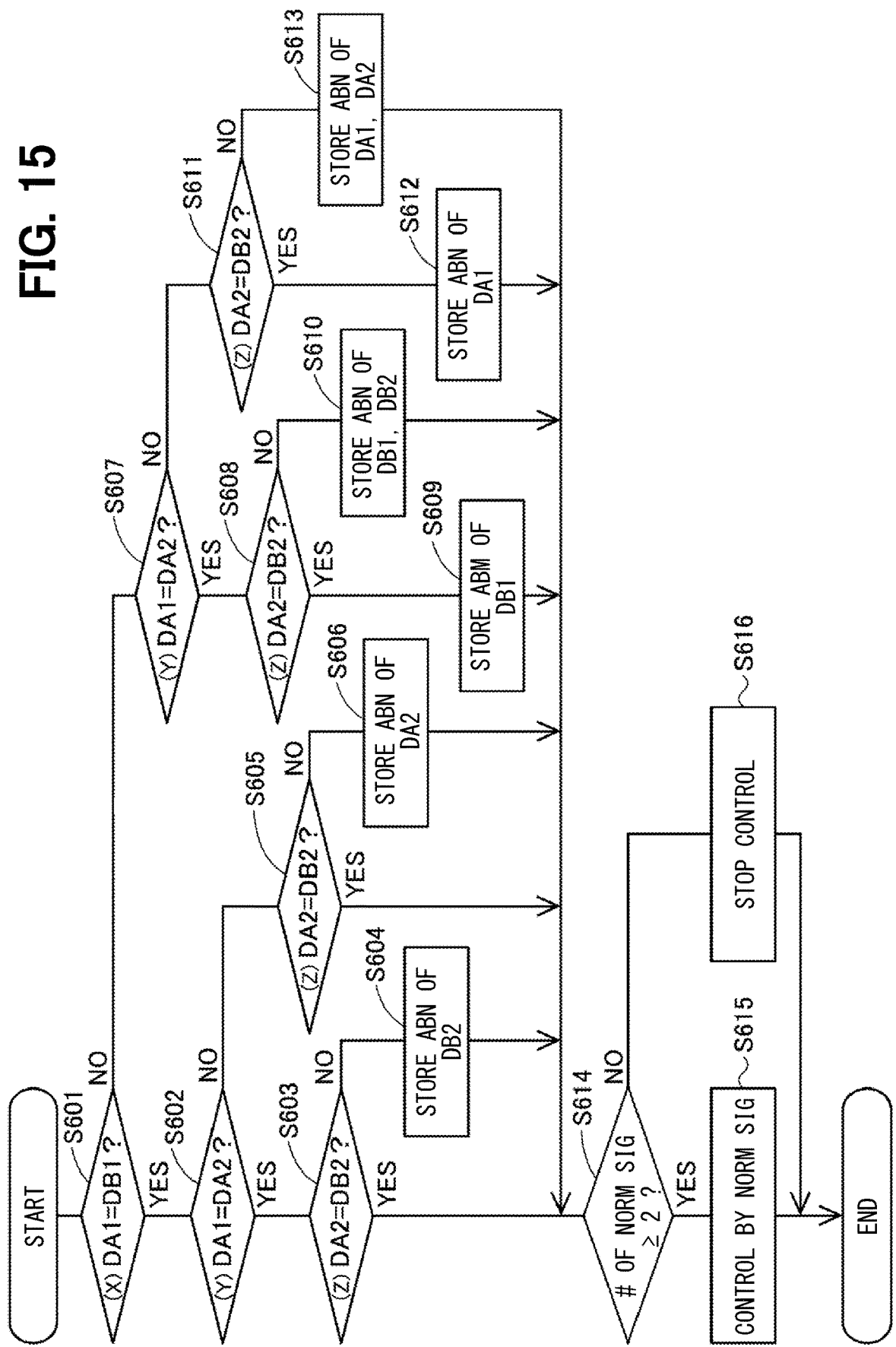
FIG. 15 is a flowchart illustrating the abnormality monitoring process according to the sixth embodiment.

The sixth embodiment is shown in FIGS. 14 and 15. In the present embodiment, as shown in FIG. 14, the angle signals DA1 and DA2 are set as signals for output in normal time, and the angle signals DB1 and DB2 are set as signals for abnormality monitoring, and the angle signals DA1 and DA2 for output are respectively compared with two other signals, and the angle signals DB1 and DB2 for abnormality monitoring are respectively compared with one other signal. More specifically, the angle signal DA1 is compared with the angle signals DB1 and DA2, and the angle signal DA2 is compared with the angle signals DB2 and DA1. The angle signal DB1 is compared with the angle signal DA1, the angle signal DB2 is compared with the angle signal DA2, and the angle signal DB1 is not compared with the angle signal DB2. Hereinafter, the comparison of the angle signals DA1 and DB1 is referred to as a "comparison X," the comparison of the angle signals DA1 and DA2 is referred to as a "comparison Y," and the comparison of the angle signals DA2 and DB2 is referred to as a "comparison Z." Note that, in the flowchart of FIG. 15, the comparisons X, Y, and Z are shown in parentheses.

Here, as an assumption, the detection elements 235 and 235 for output and the detection elements 236 and 236 for abnormality monitoring have respectively different characteristics, thereby causing no simultaneous failure. Further, in a situation like power source abnormality, the detection elements 135 and 136 may suffer simultaneous failure. However, for example, the power source abnormality may be separately detected and handled, and the abnormality monitoring process may be performed when the power source is normal.

The abnormality monitoring process of the present embodiment is described based on the flowchart of FIG. 15. In the present embodiment, a situation where the output difference ΔD of the two pieces of signal information is equal to or less than an abnormality determination threshold TH4 and the comparison result is normal is described as "DA1=DB1." Further, in the signal comparison step, when information indicating that an abnormality has occurred in at least one of the signals used for comparison in or before the previous process is stored as a record in the abnormality history information, it is determined that "the comparison result is abnormal" without performing a comparison process. That is, in the signal comparison step, when there is no abnormality history and the output difference ΔD is equal to or less than the abnormality determination threshold TH4, it is determined that "the comparison result is normal," and, when there is an abnormality history in the record, or the output difference ΔD is greater than the abnormality determination threshold TH4, it is determined that "the comparison result is abnormal."

In S601, the abnormality monitor 71 determines whether the comparison result of the angle signals DA1 and DB1 is normal. When it is determined that the comparison result of the angle signals DA1 and DB1 is abnormal (S601: NO), the process proceeds to S607. When it is determined that the comparison result of the angle signals DA1 and DB1 is normal (S601: YES), the process proceeds to S602.

In S602, the abnormality monitor 71 determines whether the comparison result of the angle signals DA1 and DA2 is normal. When it is determined that the comparison result of the angle signals DA1 and DA2 is abnormal (S602: NO), the process proceeds to S605. When it is determined that the comparison result of the angle signals DA1 and DA2 is normal (S602: YES), the process proceeds to S603.

In S603, the abnormality monitor 71 determines whether the comparison result of the angle signals DA2 and DB2 is normal. When it is determined that the comparison result of the angle signals DA2 and DB2 is normal (S603: YES), that is, if all the comparisons X, Y and Z are normal, all the angle signals DA1, DB1, DA2 and DB2 are identified as normal, and the process proceeds to S614. When it is determined that the comparison result of the angle signals DA2 and DB2 is abnormal (S603: NO), that is, when the comparisons X and Y are normal and the comparison Z is abnormal, the process proceeds to S604 determining that the angle signal DB2 is abnormal, and information indicating that the angle signal DB2 is abnormal is stored as a record in angle history information (i.e., "STORE abnormality of DB2" in S604 of FIG. 15). Then, the process proceeds to step S614.

In S605, to which the process proceeds when a negative determination is made in S602, the abnormality monitor 71 determines whether the comparison result of the angle signals DA2 and DB2 is normal. When it is determined that the comparison result of the angle signals DA2 and DB2 is normal (S605: YES), that is, when the comparisons X and Z are normal and the comparison Y is abnormal, the process proceeds to S614.

When it is determined that the comparison result of the angle signals DA2 and DB2 is abnormal (S605: NO), that is, when the comparison X is normal and the comparisons Y and Z are abnormal, the process proceeds to S606 and the angle signal DA2 is determined as abnormal, and information that the angle signal DA2 is abnormal is stored as a record in the angle history information. Then, the process proceeds to step S614.

In step S607, to which the process proceeds when a negative determination is made in step S601, the abnormality monitor 71 determines whether the comparison result of the angle signals DA1 and DA2 is normal. When it is determined that the comparison result of the angle signals DA1 and DA2 is abnormal (S607: NO), the process proceeds to S611. When it is determined that the comparison result of the angle signals DA1 and DA2 is normal (S607: YES), the process proceeds to S608.

In S608, the abnormality monitor 71 determines whether the comparison result of the angle signals DA2 and DB2 is normal. When it is determined that the comparison result of the angle signals DA2 and DB2 is normal (S608: YES), that is, when the comparisons Y and Z are normal and the comparison X is abnormal, the process proceeds to S609 and the angle signal DB1 is determined as abnormal, and information indicating that the angle signal DB1 is abnormal is stored as a record in the angle history information. Then, the process proceeds to step S614. When it is determined that the comparison result of the angle signals DA2 and DB2 is abnormal (S608: NO), that is, when the comparison Y is normal and the comparisons X and Z are abnormal, the process proceeds to S610 and the angle signals DB1 and DB2 are determined as abnormal, and information indicating that the angle signals DB1 and DB2 are abnormal is stored as a record in the angle history information. Then, the process proceeds to step S614.

In S611, to which the process proceeds when a negative determination is made in S607, the abnormality monitor 71 determines whether the comparison result of the angle signals DA2 and DB2 is normal. When it is determined that the comparison result of the angle signals DA2 and DB2 is normal (S611: YES), that is, when the comparison Z is normal and the comparisons X and Y are abnormal, the process proceeds to S612 and the angle signal DA1 is determined as abnormal, and information indicating that the angle signal DA1 is abnormal is stored as a record in the angle history information. Then, the process proceeds to step S614. When it is determined that the comparison result of the angle signals DA2 and DB2 is abnormal (S611: NO), that is, when the comparisons X, Y and Z are abnormal, the process proceeds to S613 and the angle signals DA1 and DA2 are determined as abnormal, and information indicating that the angle signals DA1 and DA2 are abnormal is stored as a record in angle history information. Then, the process proceeds to step S614.

The processes of S614 and S616 are the same as the processes of S104 and S106 in FIG. 6. In S615, to which the process proceeds when a positive determination is made in S614, the control calculator 72 performs calculation related to the drive control of the motor 80 by using the angle signal identified as normal. In the present embodiment, in the system P1, when the angle signal DA1 for output is normal, the angle signal DA1 is used for control calculation, and when the angle signal DA1 is abnormal, a signal for output is switched from the angle signal DA1 for output to the angle signal DB1 for abnormality monitoring. In the system P2, when the angle signal DA2 for output is normal, the angle signal DA2 is used for control calculation, and when the angle signal DA2 is abnormal, a signal for output is switched from the angle signal DA1 DA2 for output to the angle signal DB1 DB2 for abnormality monitoring.

In the present embodiment, regardless of which of the angle signals DA1, DB1, DA2 and DB2 is normal or abnormal, identification of the normal sensor and the abnormal sensor, recording of the abnormality history, and output of normal values are performed as a series of arithmetic processes. In such manner, the process for abnormality monitoring is simplified, in comparison to the process flow changing scheme, in which a flow (i.e., a path) of the process is changed depending on which of the elements is determined as normal or abnormal.

In the present embodiment, main signals, i.e., the angle signals DA1 and DA2 related to the main detection elements 135 and 235, are signals that are output with priority, and the sub signals, i.e., the angle signals DB1 and DB2 related to the sub detection elements 136 and 236, are signals used for abnormality monitoring of the main signal while, in case that the main signal has abnormality, serving as an alternative output signal (i.e., outputtable as the main signal) replacing the abnormal main signal.

The abnormality monitor 71 compares the main signal of a subject system with the sub signal of the subject system and the main signal of the other system. Further, the abnormality monitor 71 compares the main signal of the subject system with the angle signal of the other system. In such manner, the normal signal is appropriately identifiable. Further, by performing abnormality monitoring with priority given to the main signal, the calculation load related to the abnormality monitoring is reducible. Further, the present embodiment also provides the same advantage as the above-described embodiments.

Seventh Embodiment, Eighth Embodiment

Figure 16:
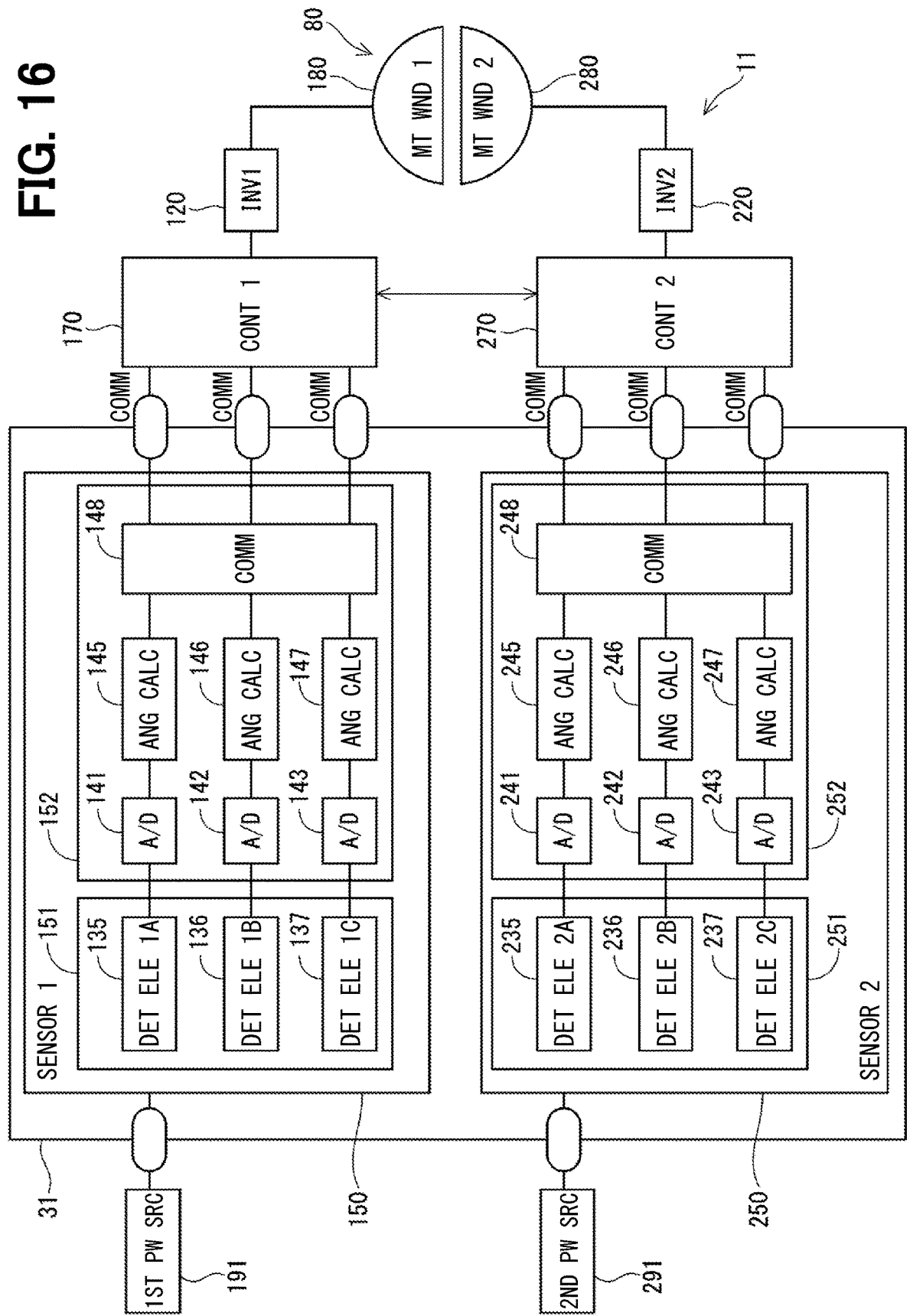
FIG. 16 is a block diagram of the ECU according to a seventh embodiment.
Figure 17:
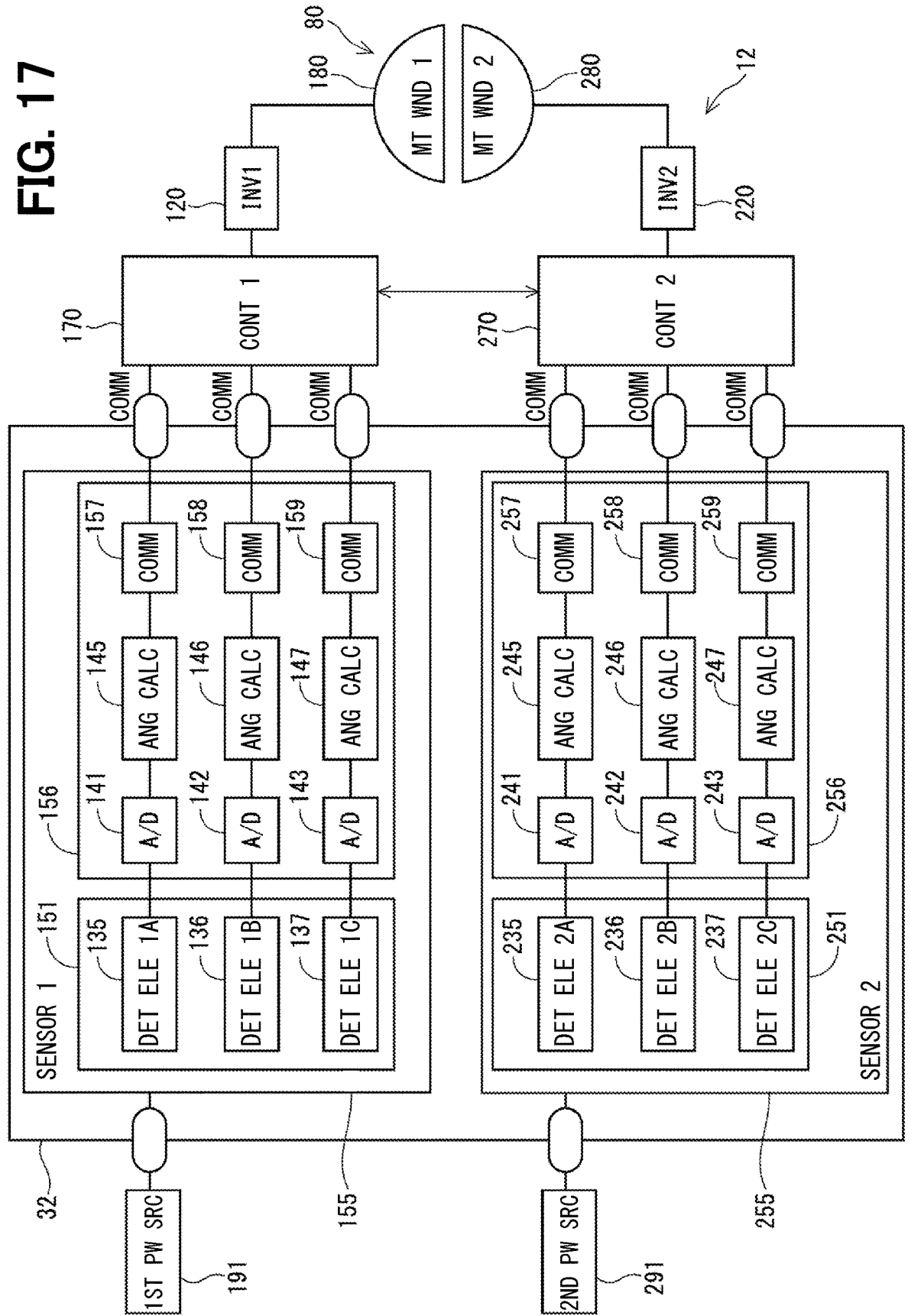
FIG. 17 is a block diagram of the ECU according to an eighth embodiment.

The seventh embodiment is shown in FIG. 16 and the eighth embodiment is shown in FIG. 17. In the present embodiment, the configuration of the ECU is different from that of the above embodiments. As shown in FIG. 16, an ECU 11 according to the seventh embodiment includes the drive circuits 120 and 220, controllers 170 and 270, a rotation angle sensor 31, and the like. The controllers 170 and 270 respectively include the abnormality monitor 71, the control calculator 72, and the notification unit 73 just like the controller 70 of the above embodiment, and the notification unit 73 is configured to be communicable with the external device 500, which is omitted from FIGS. 16 and 17.

The first controller 170 controls energization of the first motor winding 180 by controlling the on/off operation of the switching element 121 of the first drive circuit 120. The second controller 270 controls energization of the second motor winding 280 by controlling the on/off operation of the switching element 221 of the second drive circuit 220. The controllers 170 and 270 transmit and receive information by inter-computer communication or the like. The controllers 170 and 270 share angle signals by communication between computers and the like, and perform abnormality monitoring of the angle signals. The abnormality monitoring process may be performed as any one of the preceding embodiments.

The rotation angle sensor 30 includes a first sensor unit 150 and a second sensor unit 250. The first sensor unit 150 includes a first magnetic field detector 151 and a first arithmetic circuit 152, and electric power is supplied from the first power source 191. The first magnetic field detector 151 includes three detection elements 135, 136, and 137. The second magnetic field detector 251 includes three detection elements 235, 236, and 237. The detection elements 137 and 237 divide one rotation of the rotor 860 into a plurality of regions (for example, into 4 regions) to detect a change in the respective regions. In the drawing, the detection element 137 for detecting the number of rotations is designated as "1C," and the detection element 237 is designated as "2C."

The first arithmetic circuit 152 includes AD converters 141, 142, 143, angle calculators 145, 146, 147, and the communication unit 148. The first arithmetic circuit 152 includes, as additional components to the first arithmetic circuit 140, the AD converter 143 that AD-converts the detection value of the detection element 137, and the angle calculator 147 that calculates a count signal according to the detection value of the detection element 137.

The second arithmetic circuit 252 includes AD converters 241, 242, 243, angle calculators 245, 246, 247, and a communication unit 248. The second arithmetic circuit 252 includes, as additional components to the second arithmetic circuit 240, the AD converter 243 that AD-converts the detection value of the detection element 237, and the angle calculator 247 that calculates a count signal according to the detection value of the detection element 237.

The count signal is a value corresponding to the number of rotations of the rotor 860, which is a signal according to turn count values TC1 and TC2 counted up or down according to the rotation direction of the rotor 860 every time a region obtained by dividing one rotation of the rotor 860 changes, for example. The turn count values TC1 and TC2 are used for calculation of the absolute angle representing a rotation angle from reference position, including multiple rotation information. When absolute angle calculation is performed by the angle calculators 147 and 247, steering angles θs1 and θs2 obtained by calculation or by converting the calculated absolute angles by using a gear ratio are output to the controllers 170 and 270 as count signals. Further, when absolute angle calculation is performed by the controllers 170 and 270, the turn count values TC1 and TC2 are output to the controllers 170 and 270 as count signals. The abnormality monitoring of the above embodiments may be performed by using an absolute angle or a steering angle. Further, if abnormality monitoring is performable by comparing the signals corresponding to the detection values of the detection elements 137 and 237 with the angle signals DA1, DB1, DA2, and DB2, the detection elements 137 and 237 may be regarded as "detection elements."

In the present embodiment, although a detection element separate from the detection element for angle calculation is provided for the calculation of the count signal, the detection element for angle calculation may be shared for calculation of the count signal. Further, the count signal may be output also from the rotation angle sensor 30 of the above embodiments. The steering angle may possibly be changed by the user operation of the steering wheel 91 even during a period when the start switch of the vehicle (e.g., an ignition switch) is turned off. Thus, even when the start switch is turned off, the calculation of the count signal is continued. In such manner, the steering angle is appropriately calculable. Note that the angle signals DA1, DB1, DA2, and DB2 may be respectively taken as a value when the start switch is turned on, and it is not necessary to continue calculation the angle signals while the start switch is turned off.

In the present embodiment, the first controller 170 controls energization of the first motor winding 180 based on the detection value of the first sensor unit 150, and the second controller 270 controls energization of the second motor winding 280 based on the detection value of the second sensor unit 250. That is, in the present embodiment, the sensor units 150 and 250 and the controllers 170 and 270 are completely redundantly provided in two systems.

As shown in FIG. 16, an ECU 12 according to the eighth embodiment includes the drive circuits 120 and 220, the controllers 170 and 270, a rotation angle sensor 32, and the like. The rotation angle sensor 32 includes a first sensor unit 155 and a second sensor unit 255.

The first sensor unit 155 has the magnetic field detector 151 and a first arithmetic circuit 156. The first arithmetic circuit 156 is the same as the seventh embodiment except that communication units 157, 158, and 159 are provided for each of the detection elements 135, 136, and 137.

The second sensor unit 255 includes the magnetic field detector 251 and a second arithmetic circuit 256. In the second arithmetic circuit 256, communication units 257, 258, and 259 are provided for each of the detection elements 235, 236, and 237. The other points are the same as the seventh embodiment. Note that the rotation angle sensors 31 and 32 according to the seventh embodiment and the eighth embodiment may alternatively be configured to output the detection value to one controller 70. Further, the controller 70 according to the first embodiment may alternatively be configured as the system-specific controllers 170 and 270, as shown in the seventh and eighth embodiments.

The rotation angle sensors 31, 32 output count signals according to the number of rotations of the rotor 860 in addition to the angle signals DA1, DB1, DA2, DB2. In such manner, the steering angle can be calculated by using the count signal and the angle signal. Further, the present embodiment also provides the same advantages as the above-described embodiments.

In the above embodiment, the ECUs 10 to 12 correspond to a "detection unit," and the rotation angle sensors 30 to 32 correspond to a "sensor," and the main detection elements 135, 235 and the sub detection elements 136, 236 correspond to a "detection element," and the magnet 875 corresponds to a "detection object," and the magnetic field that changes according to the rotation of the magnet 875 corresponds to "a physical quantity that changes according to the rotation of the detection object," and the angle signals DA1, DB1, DA2, and DB2 correspond to a "detection signal."

Other Embodiments

In other embodiments, the number of detection elements provided in the sensor may be three or more. Though the number of rotation angle sensor is provided in two systems in the above embodiments, the number of systems may be one or three or more in other embodiments. Also, the detection signal may be used without dividing (i.e., classification of) the systems and/or the main and sub elements. In the above embodiments, electric power is supplied from a separate power source to each of the systems. In other embodiments, each system may be configured to have a supply of electric power from a common power source.

In the above embodiments, the sensor is a rotation angle sensor that detects the rotation of the motor, and the detection object is a magnet that rotates integrally with the rotor. In other embodiments, the sensor may be any sensor as long as it detects a physical quantity that changes according to the rotation, which may be, for example, a torque sensor of a twin resolver that detects a rotating magnetic field, or may also be a torque sensor that detects a magnetic field height. That is, the detection object is not limited to a motor, but may also be, for example, a steering shaft or the like. Further, if a stroke position is converted into a rotating system by using a gear, the sensor may also be applicable to a stroke sensor. Further, the present disclosure is applicable to a sensor that measures other physical quantities, such as a current sensor, a torque sensor, a pressure sensor, a temperature sensor, or a distance sensor such as a laser displacement meter.

In the above embodiments, the motor is a three-phase brushless motor. In other embodiments, the motor is not limited to a three-phase brushless motor, but may be any motor. Further, the motor is not limited to an electric motor, but may be a generator, or may be a so-called motor-generator having both functions of the motor and the generator. In the above embodiments, the inverter and motor windings are provided in two systems. In other embodiments, the number of systems, i.e., sets of inverters and motor windings, may be one or three or more. Also, the number of inverters and motor windings may be respectively different. In the above embodiments, the drive device including the detection unit is applied to the electric power steering apparatus. In other embodiments, the drive device may also be applied to other apparatuses other than the electric power steering apparatus.

The control unit described in the present disclosure and the method thereof may be realized by a dedicated computer that is configured as a combination of a processor and a memory programmed to perform one or more functions embodied by a computer program. Alternatively, the control unit described in the present disclosure and the method thereof may be realized by a dedicated computer that is provided as a configuration of a processor including one or more dedicated hardware logic circuits. Alternatively, the control unit and the method described in the present disclosure may be realized by one or more dedicated computers which is provided as a combination of (i) a processor and a memory programmed to perform one or more functions and (ii) a processor configured by one or more hardware logic circuits. Further, the computer programs mentioned above may be stored, as instructions executable by a computer, in a tangible, non-transitory, computer-readable storage medium. The present disclosure is not limited to the above embodiments, but may encompass various modifications implementable without departing from the spirit of the present disclosure.

What is claimed is:

1. A detection unit comprising:
   a sensor including at least three detection elements configured to detect a change of physical quantity and outputting detection signals respectively corresponding to detection values from the at least three detection elements; and a controller (i) including an abnormality monitor configured to monitor the detection signal and identify a normal signal and an abnormal signal, the normal signal being a normal detection signal and the abnormal signal being a detection signal having abnormality, and (ii) either (a) outputting a value corresponding to at least one of two normal detection signals when two or more normal detection signals are identified or (b) stopping output regarding the detection signal when two or more normal detection signals are not identified.

2. The detection unit of claim 1, wherein each detection element includes a main detection element and a sub detection element,
a combination of the main detection element and the sub detection element is defined as a system, and
the sensor is provided with a plurality of systems.

3. The detection unit of claim 2, wherein the main detection element and the sub detection element comprise different configurations.

4. The detection unit of claim 2, wherein the plurality of systems in the sensor are connected to respectively different power sources.

5. The detection unit of claim 2, wherein a main signal from the main detection element is a priority signal having high output priority, and
a sub signal from the sub detection element is a monitor signal used for monitoring the main signal, and is output as a replacement signal of the main signal when the main signal has abnormality.

6. The detection unit of claim 5, wherein the abnormality monitor is configured to compare the main signal of a subject system with both of the sub signal of the subject system and the main signal of an other system, and compare the sub signal of the subject system with the main signal of the subject system but not with the detection signal of the other system.

7. The detection unit of claim 1, wherein the abnormality monitor is configured to identify the normal signal by calculating a reference signal by using at least two detection signals and compare the detection signal with the reference signal.

8. The detection unit of claim 1, wherein the abnormality monitor is configured to identify the abnormal signal according to a comparison result of two detection signals, wherein the comparison of the two detection signals is performed for all combinations of the detection signals for an identification of the abnormal signal.

9. The detection unit of claim 1, wherein the abnormality monitor is configured to identify the abnormal signal according to a comparison result of the two detection signals, which is based on a comparison of at least one subject-to-comparison pair of the detection signals set in advance,
when the comparison result of the subject-to-comparison pair is normal, the abnormality monitor identifies both of the detection signals of the subject-to-comparison pair as a normal signal,
when the comparison result of the subject-to-comparison pair is abnormal, the abnormality monitor searches for a new pair having a normal comparison result, and identifies, if any, both of the detection signals of the new pair having the normal comparison result as a normal signal, and sets the new pair as a subject-to-comparison pair for a next and subsequent comparison.

10. The detection unit of claim 1, wherein the abnormality monitor is configured to identify the normal signal by performing a comparison of the two detection signals and by having a comparison result of being normal or abnormal, and performs a retry when having an abnormal comparison result, with a subject-to-comparison pair set in advance according to a number of retries, and
the abnormality monitor identifies the abnormal signal according to the number of retries.

11. The detection unit of claim 1, wherein the controller includes a notification unit configured to notify an external device of abnormality information regarding the abnormality of the detection signal.

12. The detection unit of claim 11, wherein the notification unit is configured to notify the external device of the abnormality information according to a situation of the abnormality, as first abnormality information regarding abnormality of at least one detection signal or as second abnormality information regarding that a number of normal detection signals is one or less.

13. The detection unit of claim 1, wherein identifying the normal detection signal comprises comparing each detection signal to a reference signal, and determining whether a difference between each detection signal and the reference signal is less than a threshold, and
identifying the two or more normal detection signals comprises counting a total number of the detection signals that are identified as normal signals, and determining whether the total number is greater than two or more.

14. A detection unit comprising:
a sensor including at least three detection elements configured to detect a change of physical quantity and outputting detection signals respectively corresponding to detection values from the at least three detection elements; and
a controller including an abnormality monitor configured to:
compare each detection signal to a reference signal;
determine whether each detection signal is a normal signal or an abnormal signal by determining whether a difference between each detection signal and the reference signal is less than an abnormality determination threshold, each normal signal comprising a detection signal in which the difference between a respective detection signal and the reference signal is less than or equal to the abnormality determination threshold, each abnormal signal comprising a detection signal in which the difference between the respective detection signal and the reference signal is greater than the abnormality determination threshold;
count a total number of normal signals among the detection signals;
determine whether the total number of normal signals is greater than or equal to a predetermined threshold; and
output a value corresponding to at least one of the respective detection signals that are determined to be normal signals, in response to the total number of normal signals being greater than or equal to the predetermined threshold.

* * * * *